US006365101B1

(12) United States Patent
Nguyen et al.

(10) Patent No.: US 6,365,101 B1
(45) Date of Patent: *Apr. 2, 2002

(54) METHODS OF PREVENTING SCALING INVOLVING INORGANIC COMPOSITIONS, AND COMPOSITIONS THEREFOR

(75) Inventors: Duy T. Nguyen; Mitzi K. Fader, both of Jacksonville, FL (US); Xiang Huai Wang, Alpharetta, GA (US); Fushan Zhang, Jacksonville, FL (US); Tien-Feng Ling, Alpharetta, GA (US)

(73) Assignee: Hercules Incoporated, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/523,663

(22) Filed: Mar. 10, 2000

Related U.S. Application Data

(63) Continuation-in-part of application No. 09/333,891, filed on Jun. 16, 1999.

(51) Int. Cl.$^7$ .............................. C23F 11/06; C23F 11/18

(52) U.S. Cl. ......................................... 422/13; 422/18

(58) Field of Search ...................................... 422/13, 18

(56) References Cited

U.S. PATENT DOCUMENTS

| | | |
|---|---|---|
| 2,358,222 A | 9/1944 | Fink et al. |
| 2,539,305 A | 1/1951 | Hatch |
| 2,917,528 A | 12/1959 | Ramsey et al. |
| 2,964,549 A | 12/1960 | Ramsey et al. |
| 3,514,476 A | 5/1970 | Morita |
| 3,518,204 A | 6/1970 | Hansen et al. |
| 3,584,687 A | 6/1971 | Stanford et al. |
| 3,928,196 A | 12/1975 | Persinski et al. |
| 3,960,576 A | 6/1976 | Carter et al. |
| 3,965,027 A | 6/1976 | Boffardi et al. |
| 4,008,164 A | 2/1977 | Watson et al. |
| 4,080,375 A | 3/1978 | Quinlan |
| 4,206,033 A | 6/1980 | Neavel et al. |
| 4,444,675 A | 4/1984 | Goeldner |
| 4,457,847 A | 7/1984 | Lorenc et al. |
| 4,640,793 A | 2/1987 | Persinski et al. |
| 4,643,801 A | 2/1987 | Johnson |
| 4,650,591 A | 3/1987 | Boothe et al. |
| 4,671,888 A | 6/1987 | Yorke |
| 4,753,710 A | 6/1988 | Langley et al. |
| 4,778,006 A | 10/1988 | Derowitsch |
| 4,872,995 A | 10/1989 | Chen et al. |
| 4,931,189 A | 6/1990 | Dhawan et al. |
| 4,936,987 A | 6/1990 | Persinski et al. |
| 5,062,962 A | 11/1991 | Brown et al. |
| 5,124,046 A | 6/1992 | Sherwood et al. |
| 5,147,555 A | 9/1992 | Brown et al. |
| 5,182,028 A | 1/1993 | Boffardi et al. |
| 5,194,120 A | 3/1993 | Peats et al. |

(List continued on next page.)

FOREIGN PATENT DOCUMENTS

| | | |
|---|---|---|
| CA | 2229973 | 8/1998 |
| EP | 516382 | 12/1992 |
| EP | 916622 | 5/1999 |
| JP | 2-53551 | 11/1990 |
| WO | 97/17289 | 5/1997 |

OTHER PUBLICATIONS

Manahan, *Environmental Chemistry*, pp. 183–213 (1991).
*Kirk–Othmer Encyclopedia of Chemical Technology*, 3rd ed., vol. 24, pp. 367–84 (1984).
Boardman, "The Use of Organophilic Mineral Particulates in the Control of Anionic Trash Like Pitch", TAPPI Proceedings, pp. 533–538 (1996).
English language abstract of JP 2-53551.
Gess, *Retention of Fines and Fillers During Papermaking*, p. 273 (1998).
*Tappi Journal*, vol. 77, p. 140 (Dec. 1994).
Adams, "Low–Cost Evaporator Upgrades Boost Performance, Reduce Scaling", *Pulp & Paper*, pp. 83–89 (Feb. 1999).
"Deactivation of Calcium Scaling Liquors", The Menbers of the Institute of Paper Chemistry, Project 3234, Report Three, pp. 88–119 (Nov. 1977).
Schellhamer et al., "Agents for the Control of Pitch, Scale and Other Nonmicrobiological Deposits", Chapter 2, pp. 1–8 and Fig. 1.
Announcement: "Announcing– A Major Breakthrough in Kraft Pitch Control", pp. 1–8.

Primary Examiner—Krisanne Thornton
(74) Attorney, Agent, or Firm—Greenblum & Bernstein P.L.C.

(57) ABSTRACT

Method for inhibiting scale deposits in an aqueous system. The method may include at least one of adding and forming anti-scalant in the aqueous system such that an amount of anti-scalant in the aqueous system is up to about 1000 ppm, wherein the anti-scalant comprises at least one of polyvalent metal silicate and polyvalent metal carbonate, wherein the aqueous system has a pH of at least about 9, and wherein a mean particle size of the anti-scalant is less than about 3 microns. The method may also include at least one of adding and forming anti-scalant in the aqueous system such that an amount of anti-scalant in the aqueous system is up to about 1000 ppm, wherein the anti-scalant comprises at least one of polyvalent metal silicate and polyvalent metal carbonate, and wherein the aqueous system has a pH of at least about 9; and adding dispersant to the aqueous system. The method may involve forming anti-scalant in the aqueous system such that an amount of anti-scalant in the aqueous system is up to about 1000 ppm, wherein the anti-scalant comprises at least one of polyvalent metal silicate and polyvalent metal carbonate, and wherein a mean particle size of the anti-scalant is less than about 3 microns. The method may further include at least one of adding and forming anti-scalant in the aqueous system, wherein the anti-scalant comprises at least one of polyvalent metal silicate and polyvalent metal carbonate; and adding at least one protein to the aqueous system. Compositions therefor.

107 Claims, No Drawings

U.S. PATENT DOCUMENTS

| | | |
|---|---|---|
| 5,259,974 A | 11/1993 | Chen et al. |
| 5,282,976 A | 2/1994 | Yeung |
| 5,292,834 A | 3/1994 | Watanabe et al. |
| 5,326,478 A | 7/1994 | Perez et al. |
| 5,378,372 A | 1/1995 | Carey et al. |
| 5,378,390 A | 1/1995 | Perez et al. |
| 5,407,583 A | 4/1995 | Gill et al. |
| 5,409,571 A | 4/1995 | Togo et al. |
| 5,441,602 A | 8/1995 | Harris et al. |
| 5,489,666 A | 2/1996 | Carey et al. |
| 5,496,914 A | 3/1996 | Wood et al. |
| 5,518,629 A | 5/1996 | Perez et al. |
| 5,518,630 A | 5/1996 | Freese et al. |
| 5,580,462 A | 12/1996 | Gill |
| 5,629,385 A | 5/1997 | Kuo |
| 5,647,995 A | 7/1997 | Kneller et al. |
| 5,672,279 A | 9/1997 | Sargent et al. |
| 5,772,893 A | 6/1998 | Reed et al. |
| 5,866,032 A | 2/1999 | Carey et al. |

METHODS OF PREVENTING SCALING INVOLVING INORGANIC COMPOSITIONS, AND COMPOSITIONS THEREFOR

CROSS-REFERENCE TO RELATED APPLICATIONS

The present application is a continuation-in-part application of U.S. application Ser. No. 09/333,891, filed Jun. 16, 1999, the disclosure of which is expressly incorporated by reference herein in its entirety.

BACKGROUND OF THE INVENTION

1. Field of the Invention

The present invention relates to methods and inorganic compositions, such as polyvalent metal silicates and polyvalent metal carbonates, for inhibiting the formation, deposition, and/or adherence of scale deposits on substrate surfaces in contact with a scale-forming aqueous system. The scale deposits may be alkaline earth metal scale deposits, such as alkaline earth metal carbonate scale deposits, especially calcium carbonate scale deposits, or alkaline earth metal oxalate deposits. The present invention may be advantageously used to prevent scale in a variety of processes such as kraft pulping processes.

2. Discussion of Background

Scale build-up is a serious problem in many industrial water systems, such as cooling towers, heat exchangers, evaporators, pulping digesters, washers, and in the production and processing of crude oil-water mixtures, etc. The build-up of scale deposits reduces the efficiency of heat transfer systems, interferes with fluid flow, facilitates corrosive processes and harbors bacteria. Calcium carbonate, generated in various processes, is one of the most commonly observed scale formers in industrial water systems. This scale is an expensive problem in many industries, which causes delays and shutdowns for cleaning and removal.

In particular, most industrial waters contain metal ions, such as calcium, barium, magnesium, aluminium, strontium, iron, etc. and several anions such as bicarbonate, carbonate, sulfate, oxalate, phosphate, silicate, fluoride, etc. When combinations of these anions and cations are present in concentrations which exceed the solubility of their reaction products, precipitates form until product solubility concentrations are no longer exceeded. For example, when the concentrations of calcium ion and carbonate ion exceed the solubility of the calcium carbonate reaction products, a solid phase of calcium carbonate will form.

Solubility product concentrations are exceeded for various reasons, such as partial evaporation of the water phase, change in pH, temperature or pressure, and the introduction of additional ions which form insoluble compounds with the ions already present in the solution. As these reaction products precipitate on the surfaces of the water carrying system, they form scale or deposits.

For boiler systems and similar heat exchange systems, the mechanism of scale formation is apparently one of crystallization of scale-forming salts from a solution which is locally supersaturated in the region adjacent the heating surface of the system. The thin viscous film of water in this region tends to become more concentrated than the remainder of the solution outside this region. As a result, the solubility of the scale-forming salt reaction product is first exceeded in this thin film, and crystallization of scale results directly on the heating surface. In addition to this, a common source of scale in boiler systems is the breakdown of calcium bicarbonate to form calcium carbonate water and carbon dioxide under the influence of heat.

For open recirculating cooling water systems, in which a cooling tower, spray pond, evaporative condenser, and the like serve to dissipate heat by evaporation of water, the chief factor which promotes scale formation is concentration of solids dissolved in the water by repeated evaporation of portions of the water phase. Thus, even a water which is not scale forming on a once-through basis usually will become scale forming when concentrated a multiple number of times.

Also as disclosed in U.S. Pat. No. 3,518,204 to HANSEN et al., the disclosure of which is herein incorporated by reference in its entirety, water supplies employed as cooling media frequently contain silts such as bentonitic or kaolinitic minerals. During use of such silt containing waters in these systems, the silts react or associate with other impurities which are present in the water such as calcium and magnesium which are commonly referred to as "hardness". As a consequence of such reaction or association, a precipitate is formed and precipitated upon the surfaces of the system containing the water. Such depositions may build up to the extent that flow through the system is reduced or halted, and the system must be shut down for costly cleaning. In addition, when such deposition occurs on heat transfer surfaces, heat exchange is reduced with a corresponding loss in process efficiency.

Scaling in kraft pulping processes occurs by a different mechanism as a result of the presence of organic ligands. Black liquor generated in the kraft pulping digester contains a very high content of organics such as lignin, fatty/rosin soaps, hemicelluloses, etc. Lignin fragments formed during pulping, specifically those containing adjacent hydroxyl groups on an aromatic ring, have a high tendency to interact with calcium (originally from tree) to greatly increase its solubility in black liquor. As the temperature increases (e.g., the temperature found near the tube wall of an evaporator or cooking heater), the pH has a tendency to decrease, especially if the residual active alkali is low. As a consequence, calcium ions can be displaced from the lignin by hydrogen ions, and react with carbonate ions thus producing calcium carbonate scale. In addition to lignin, there are many different organic species that complex calcium in the black liquor. Any of these organic species, whose ability to complex with calcium depends on the pH being in the normal pH range of black liquor, will contribute to calcium carbonate scaling by releasing ionic calcium as the temperature increases. Therefore, as long as some of the aforementioned organic compounds are present and sufficient calcium is available, a liquor will have the capacity to deposit calcium carbonate scale. In addition to calcium and carbonate, black liquor normally contains a number of other ions such as sodium and sulfate which can precipitate and form scale.

In the paper industry, alkalinity from alkali digesting solution and from dissolved solids from the wood chips, results in an increased alkalinity of the black liquor, often reaching pH's of 12–13 and even higher. Under high pH conditions, the precipitation of calcium carbonate is especially difficult to control. Acid is often added to lower the pH to prevent calcium carbonate scaling.

In the papermaking process, calcium oxalate scale often forms on process equipment during the bleaching/delignification of pulp by chlorine, caustic soda, chlorine dioxide, hypochlorite and peroxide. Usual areas of scale build-up are on washer drum face wires; in washer vats; in stock lines and pumps; in filtrate tanks, lines, and pumps; on extraction screens; and in treatment towers. The formation of calcium oxalate scale provides an economic hardship on mills principally because of lost production due to decreased bleaching/delignification efficiency and equipment downtime associated with the removal of scale.

In the oil industry, the formation of insoluble calcium salts is also a problem in the secondary recovery of oil from subterranean formations by processes in which water is introduced into injection wells and forced through the underground formations to cause oil to be produced in a producing well. This type of process is usually referred to as a waterflood system.

In view of the above, scale formation and deposition are generated by the mechanisms of nucleation, crystal growth, and aggregation of scale-forming particles. Various approaches to reducing scale development include inhibition of nuclei/crystal formation, modification of crystal growth, and dispersion of the scale-forming particles.

Chelating or sequestering agents have been commonly used to prevent deposition, precipitation and crystallization of calcium carbonate in water-carrying systems. Other types of chemicals which have been actively explored as calcium carbonate scale inhibiting agents are threshold inhibitors.

Threshold inhibitors include water soluble polymers, phosphonates, and polyphosphates (e.g., U.S. Pat. No. 5,182,028 to BOFFARDI et al., the disclosure of which is herein incorporated by reference in its entirety, discloses sodium hexametaphosphate and monofluorophosphate). Such chemicals are effective as scale inhibitors in amounts considerably less than that stoichiometrically required.

Water soluble polymers, including groups derived from acrylamide, maleic acid, vinyl acetate, vinyl alcohol, and acrylic acid have been used to control calcium carbonate deposition. For instance, such polymers are disclosed in U.S. Pat. No. 5,282,976 to YEUNG; U.S. Pat. No. 5,496,914 to WOOD et al.; U.S. Pat. No. 4,008,164 to WATSON et al.; U.S. Pat. No. 3,518,204 to HANSEN et al.; U.S. Pat. Nos. 3,928,196 and 4,936,987 to PERSINSKI et al.; U.S. Pat. No. 3,965,027 to BOFFARDI et al.; U.S. Pat. No. 5,441,602 to HARRIS et al.; U.S. Pat. No. 5,580,462 to GILL; and U.S. Pat. No. 5,409,571 to TOGO et al., the disclosures of which are herein incorporated by reference in their entireties.

Polyallylamines having phosphonic, carboxylic, or sulfonic groups are also used as scale control agents as disclosed in U.S. Pat. No. 5,629,385 to KUO and U.S. Pat. No. 5,124,046 to SHERWOOD et al., the disclosures of which are herein incorporated by reference in their entireties.

Additionally, a number of anionic polyelectrolytes, such as polyacrylates, polymaleic anhydrides, copolymers of acrylates and sulfonates, and polymers of sulfonate styrenes, have been employed. Examples of polyelectrolytes are disclosed in U.S. Pat. No. 4,640,793 to PERSINSKI et al.; U.S. Pat. No. 4,650,591 to BOOTHE et al.; U.S. Pat. No. 4,457,847 to LORENC et al.; U.S. Pat. No. 5,407,583 to GILL et al.; and U.S. Pat. No. 4,671,888 to YORKE, the disclosures of which are herein incorporated by reference in their entireties.

Polyepoxysuccinic acid for inhibiting the formation and deposition of scale in aqueous systems is disclosed in U.S. Pat. Nos. 5,062,962 and 5,147,555 to BROWN et al., the disclosures of which are herein incorporated by reference in their entireties.

Phosphonate based compounds are extensively used as calcium carbonate scale control agents. Examples include ether diphosphonate (U.S. Pat. No. 5,772,893 to REED et al., and U.S. Pat. No. 5,647,995 to KNELLER et al., the disclosures of which are herein incorporated by reference in their entireties), hydroxyethylidene-1,1-diphosphonic acid, amino tri(methylene phosphonic acid), aminomethylene phosphonates (U.S. Pat. No. 4,931,189 to DHAWAN et al., the disclosure of which is herein incorporated by reference in its entirety), N,N-bis(phosphonomethyl)-2-amino-1-propanol (U.S. Pat. No. 5,259,974 to CHEN et al., the disclosure of which is herein incorporated by reference in its entirety), methylene phosphonates of amino-terminated oxyalkylates (U.S. Pat. No. 4,080,375 to QUINLAN, the disclosure of which is herein incorporated by reference in its entirety), polyether polyamino methylene phosphonates (EP 0 516 382 B 1, the disclosure of which is herein incorporated by reference in its entirety), and ethanolamine N,N-dimethylene phosphonic acid (U.S. Pat. Nos. 2,917,528 and 2,964,549 to RAMSEY et al., the disclosures of which are herein incorporated by reference in their entireties).

Additionally, it is known that certain inorganic polyphosphonates would prevent precipitation when added in amounts less than the concentrations needed for sequestering or chelating, as disclosed in U.S. Pat. No. 2,358,222 to FINK et al. and U.S. Pat. No. 2,539,305 to HATCH, the disclosures of which are herein incorporated by reference in their entireties.

U.S. Pat. No. 3,960,576 to CARTER et al., the disclosure of which is herein incorporated by reference in its entirety, discloses that inorganic-silicate-based compositions also comprised of an organic phosphonate and carboxy methyl cellulose are useful for inhibiting corrosion of metal surfaces.

MANAHAN, *Environmental Chemistry*, pp. 183–213 (1991), the disclosure of which is herein incorporated by reference in its entirety, with particular attention directed to pp. 193–195, discloses use in environmental chemistry of sodium aluminum silicate minerals or zeolites as water softeners. The softening of water by aluminum silicate minerals and zeolites is based on ion-exchanging properties of the minerals. The divalent cations, which are responsible for water hardness, are replaced by sodium ions contained in the aluminum silicates, and then removed by filtration. An example of a micaceous mineral which has been used commercially in water softening is glauconite, $K_2(MgFe)_2Al_6(Si_4O_{10})_3OH_{12}$.

*Kirk-Othmer Encyclopedia of Chemical Technology*, 3rd ed., vol. 24, pp. 367–384 (1984), the disclosure of which is herein incorporated by reference in its entirety, discloses that deposits are usually controlled with dispersants and scale inhibitors in cooling and process water. Among the dispersants mentioned are polymers and copolymers, for example, poly(acrylic acid) and its salts, acrylamideacrylic acid copolymers and poly(maleic acid).

"Deactivation of Calcium Scaling Liquors", The Members of the Paper Institute of Paper Chemistry, Project 3234, Report Three, pp. 88–119 (November 1977), the disclosure of which is herein incorporated by reference in its entirety, discloses adding reagent grade calcium carbonate at 1% loading in most experiments and at 5% and 20% in a few other experiments, to function as a seed in the liquor as a deposition surface for calcium carbonate.

ADAMS, "Low-Cost Evaporator Upgrades Boost Performance, Reduce Scaling", Pulp & Paper, pp. 83–89 (February 1999), discloses a salting method which involves adding sodium sulfate to control scaling.

CA 2,229,973 discloses a method of inhibiting black liquor in evaporators, wherein the liquor is heat-treated to precipitate calcium carbonate. This document discloses that no calcium carbonate needs to be added to the liquor to be heat-treated.

EP 0 916 622 discloses a process for preventing scale formation in a paper-making process, wherein calcium sulfate or calcium oxalate are added as a seed to prevent formation of calcium sulfate scale or calcium oxalate scale, respectively.

Further, it is known to use clays such as talc and bentonite in paper making for fillers, pitch control, and retention and drainage control. In filler applications, talc or bentonite may be added in an amount which is typically relatively high.

In pitch control applications, talc or bentonite may be added before the washer and after the digester. At this position, the temperature of the aqueous system is relatively low. The use of talc and bentonite for pitch control is discussed in BOARDMAN, "The Use of Organophilic Mineral Particulates in the Control of Anionic Trash Like Pitch", *TAPPI Proceedings* (1996), the disclosure of which is herein incorporated by reference in its entirety. In particular, this article discloses using two pounds per ton of montmorillonite. It is known that pitch deposits may sometimes include calcium carbonate.

In retention and drainage control, it is believed that bentonite and a high molecular weight cationic polymer (e.g., molecular weight of about $1 \times 10^6$ to $10 \times 10^6$) may be added just before the headbox. For instance, it is believed that 3–10 lb of bentonite/ton of oven dried fibers may be added near the headbox which would result in about 15–50 ppm of bentonite in the aqueous system for a 1 wt % aqueous paper furnish. It is believed that the aqueous system just before the headbox typically has a pH of about 5 to 8.5 and a temperature of about 40° C. to 60° C. As an example, U.S. Pat. No. 4,753,710 to LANGLEY et al. teaches that the bentonite particle size after swelling is preferably at least 90% below 2 microns.

SUMMARY OF THE INVENTION

The present invention is directed to preventing scale formation and/or deposition, such as alkaline earth metal scale deposition, especially calcium carbonate scale deposition, or alkaline earth metal oxalate scale deposition.

The present invention is also directed to providing inorganic compounds, such as polyvalent metal silicates and polyvalent metal carbonates, that can effectively prevent scale formation and/or deposition.

The present invention is further directed to providing a family of compounds that can effectively prevent scale formation and/or deposition on surfaces, such as metallic and plastic surfaces, in contact with a scale-forming aqueous system.

In accordance with one aspect, the present invention is directed to a method for inhibiting scale deposits in an aqueous system, comprising: at least one of adding and forming anti-scalant in the aqueous system such that an amount of anti-scalant in the aqueous system is up to about 1000 ppm, wherein the anti-scalant comprises at least one of polyvalent metal silicate and polyvalent metal carbonate, wherein the aqueous system has a pH of at least about 9, and wherein a mean particle size of the anti-scalant is less than about 3 microns.

In accordance with another aspect, the present invention is directed to a method for inhibiting scale deposits in an aqueous system, comprising: at least one of adding and forming anti-scalant in the aqueous system such that an amount of anti-sealant in the aqueous system is up to about 1000 ppm, wherein the anti-scalant comprises at least one of polyvalent metal silicate and polyvalent metal carbonate, and wherein the aqueous system has a pH of at least about 9; and adding dispersant to the aqueous system.

In accordance with still another aspect, the present invention is directed to a method for inhibiting scale deposits in an aqueous system, comprising: forming anti-scalant in the aqueous system such that an amount of anti-scalant in the aqueous system is up to about 1000 ppm, wherein the anti-scalant comprises at least one of polyvalent metal silicate and polyvalent metal carbonate, wherein a mean particle size of the anti-scalant is less than about 3 microns.

In accordance with yet another aspect, the present invention is directed to a method for inhibiting scale deposits in an aqueous system, comprising: forming anti-scalant in the aqueous system such that an amount of anti-scalant in the aqueous system is up to about 1000 ppm, wherein the anti-scalant comprises at least one of polyvalent metal silicate and polyvalent metal carbonate; and adding dispersant to the aqueous system.

In accordance with another aspect, the present invention is directed to a method for inhibiting scale deposits in an aqueous system of a pulping mill, comprising: at least one of adding and forming anti-scalant in the aqueous system at at least one of before a pulping digester and at a pulping digester, wherein the anti-scalant comprises at least one of polyvalent metal silicate and polyvalent metal carbonate.

In accordance with still another aspect, the present invention is directed to a method for inhibiting scale deposits in an aqueous system of a pulping mill, comprising: at least one of adding and forming anti-scalant in the aqueous system at at least one of immediately before a bleach plant stage and at a bleach plant stage, wherein the anti-scalant comprises at least one of polyvalent metal silicate and polyvalent metal carbonate.

In accordance with yet another aspect, the present invention is directed to a method for inhibiting scale deposits in an aqueous system, comprising: at least one of adding and forming anti-scalant in the aqueous system such that an amount of anti-scalant in the aqueous system is up to about 1000 ppm, wherein the anti-scalant comprises at least one of magnesium aluminum silicate, hydrated magnesium aluminum silicate, calcium bentonite, saponite, sepiolite, magnesium carbonate, ferrous carbonate, manganese carbonate, dolomite, hectorite, amorphous magnesium silicate, and zinc carbonate.

In accordance with a further aspect, the present invention is directed to a method for inhibiting scale deposits in an aqueous system, comprising: at least one of adding and forming anti-scalant in the aqueous system such that an amount of anti-scalant in the aqueous system is up to about 1000 ppm, wherein the anti-scalant comprises polyvalent metal carbonate, wherein a mean particle size of the anti-scalant is less than about 3 microns.

In accordance with another aspect, the present invention is directed to a method for inhibiting scale deposits in an aqueous system, comprising: at least one of adding and forming anti-scalant in the aqueous system such that an amount of anti-scalant in the aqueous system is up to about 1000 ppm, wherein the anti-scalant comprises polyvalent metal carbonate; and adding dispersant to the aqueous system.

In accordance with yet another aspect, the present invention is directed to a method for inhibiting scale deposits in an aqueous system, comprising: at least one of adding and forming anti-scalant in the aqueous system, wherein the anti-scalant comprises at least one of polyvalent metal silicate and polyvalent metal carbonate; and adding at least one protein to the aqueous system.

In accordance with still another aspect, the present invention is directed to a composition comprising: at least one of polyvalent metal silicate and polyvalent metal carbonate; at least one protein; and wherein a weight ratio of the at least one polyvalent metal silicate and polyvalent metal carbonate to the at least one protein is from about 50:1 to 1:1.

In one aspect, the anti-scalant comprises polyvalent metal silicate and comprises at least one of sodium montmorillonite, magnesium aluminum silicate, talc, hydrated magnesium aluminum silicate, calcium bentonite, saponite, sepiolite, sodium aluminosilicate, hectorite, and amorphous magnesium silicate.

In another aspect, the anti-scalant comprises polyvalent metal carbonate and comprises at least one of calcium carbonate, magnesium carbonate, ferrous carbonate, manganese carbonate, dolomite, and zinc carbonate. For example, the anti-scalant may comprise ground calcium carbonate. As another example, the anti-scalant comprises ground calcium carbonate and sodium montmorillonite.

In still another aspect, the anti-scalant has a specific surface area of about 10 to 1000 m$^2$/g.

In another aspect, the scale comprises alkaline earth metal scale. In this regard, the scale may comprise at least one of calcium carbonate and calcium oxalate.

In yet another aspect, the aqueous system may have a concentration of $Ca^{+2}$ of about 10 to 500 ppm and a concentration of $CO_3^{-2}$ of about 100 to 30,000 ppm prior to addition of the anti-scalant. As another example, the aqueous system may have a concentration of $Ca^{+2}$ of about 10 to 500 ppm and a concentration of oxalate of about 0.1 to 10,000 ppm prior to addition of the anti-scalant.

In another aspect, the aqueous system has a temperature of about 25° C. to 500° C.

In still another aspect, the aqueous system is at a pressure of about 80 to 1500 psi.

In a further aspect, the anti-scalant is at least one of added and formed one of before and in at least one of a cooling tower, heat exchanger, evaporator, pulping digester, pulp washer, and pulp bleaching equipment.

In yet another aspect, the aqueous system involves one of papermaking, mining, textile making, auto making, food processing, steel making, water treatment, and petroleum processing.

In still another aspect, at least one additional anti-scalant is added to the aqueous system.

In another aspect, at least one protein is added to the aqueous system.

In a further aspect, the scale comprises calcium carbonate, the anti-scalant has a specific surface area of about 10 to 1000 m$^2$/g, the aqueous system has a pH of about 9 to 14, the aqueous system has a concentration of $Ca^{+2}$ of about 10 to 500 ppm and a concentration of $CO_3^{-2}$ of about 100 to 30,000 ppm prior to addition of the anti-scalant, and the aqueous system has a temperature of about 25° C. to 500° C.

In another aspect, up to about 10 ppm of coagulant is added to the aqueous system.

In still another aspect, the anti-scalant is removed from the aqueous system by using at least one of a clarifier, flotation cell, settling tank, filter, centrifuge, and osmosis device.

In some aspects, the aqueous system has a pH of about 2 to 12. As another example, the aqueous system has a pH of about 2 to 14.

In another aspect, the aqueous system is oxidative.

In yet another aspect, the scale comprises at least one of calcium oxalate and calcium carbonate, the anti-scalant has a specific surface area of about 10 to 1000 m$^2$/g, the aqueous system has a pH of about 2 to 12, the aqueous system has a concentration of $Ca^{+2}$ of about 10 to 500 ppm prior to addition of the anti-scalant, also prior to addition of the anti-scalant the aqueous system has at least one of a concentration of oxalate of about 0.1 to 10,000 ppm and a concentration of $CO_3^{-2}$ of about 100 to 30,000 ppm, and the aqueous system has a temperature of about 25° C. to 500° C.

In some aspects, the anti-scalant has a mean particle size less than about 100 microns.

In another aspect, the at least one protein comprises soy protein.

In yet another aspect, the composition also includes water and wood pulp.

DETAILED DESCRIPTION OF THE INVENTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

All percent measurements in this application, unless otherwise stated, are measured by weight based upon 100% of a given sample weight. Thus, for example, 30% represents 30 weight parts out of every 100 weight parts of the sample.

Unless otherwise stated, a reference to a compound or component, includes the compound or component by itself, as well as in combination with other compounds or components, such as mixtures of compounds.

Before further discussion, a definition of the following terms will aid in the understanding of the present invention.

"Nucleation initiator/promoter": substance which initiates and promotes nucleation and precipitation of polyvalent metal silicate or polyvalent metal carbonate in the solution phase.

"Water hardness": amount of magnesium and calcium ions in an aqueous solution.

As an overview, the present invention relates to methods and inorganic compositions for inhibiting the formation, deposition, and adherence of scale deposits on substrate surfaces in contact with a scale-forming aqueous system. The scale deposits may be alkaline earth metal scale deposits, such as alkaline earth metal carbonate scale deposits, especially calcium carbonate scale deposits, or alkaline earth metal oxalate scale.

The preferred anti-scalants of the present invention include polyvalent metal silicates and polyvalent metal carbonates. The polyvalent metal silicate or polyvalent metal carbonate may be crystalline or amorphous. The polyvalent metal silicates and polyvalent metal carbonates may have functional groups such as carboxylic, sulfonate, sulfate, and phosphate. For example, the functional groups may be obtained by treating a polyvalent metal silicate or polyvalent metal carbonate with an organic or inorganic compound having a functional group such as carboxylic, sulfonate, sulfate, and phosphate. Examples of these compounds include polymers such as polyacrylate and polyacrylic acid, and surfactants such as alkylbenzene sulfonate, alkylbenzene sulfate, and alkylbenzene phosphate ester.

Polyvalent metal silicates include clays. Clays are naturally occurring hydrous aluminosilicates with a 2- or 3-layer crystal structure which has ion substitution for aluminium, examples of such ion substitutes include magnesium, iron, and sodium. Alkali and alkaline earth elements may also be constituents of clays. Hydrogen is usually present as hydroxyl in the structure and as water both within the structure and absorbed on the surface. These substitutions create a wide diversity in chemical composition within the broad general class of phyllosilicates or layer silicates. It is well known that relatively small differences in the chemical composition of clays can greatly influence their chemical and physical properties.

All phyllosilicates contain silicate or aluminosilicate layers in which sheets of tetrahedrally coordinated cations, Z, such as ions of magnesium, aluminum, and iron, of composition $Z_2O_5$, are linked through shared oxygens to sheets of cations, which are octahedrally coordinated to oxygens and hydroxyls. When one octahedral sheet is linked to one tetrahedral sheet, a 1:1 layer is formed as in kaolinite; when one octahedral sheet is linked to two tetrahedral sheets, one on each side, a 2:1 layer is produced as in talc and pyrophyllite. Structural units that may be found between aluminosilicate layers are sheets of cations octahedrally coordinated with hydroxyls, as in chlorites, and individual cations which may or may not be hydrated, as in smectites, bentonites, vermiculites, and micas. Some 2:1 layer silicates swell in water, ethylene glycol, and a wide range of similar compounds by intercalation of molecules between 2:1 layers.

Polyvalent metal carbonates include various combinations of polyvalent metals and carbonates. Preferred examples of the polyvalent metal include calcium, magnesium, iron, manganese, and zinc. For instance, alkaline earth metal carbonates include calcium carbonate mixed with magnesium carbonate.

The polyvalent metal silicates and polyvalent metal carbonates may be synthetic or naturally occurring. Examples of synthetic polyvalent metal silicates and polyvalent metal carbonates include precipitated calcium carbonate and silica-derived products such as magnesium silicate, aluminosilicate, magnesium aluminum silicate, etc. As discussed in more detail below, various particle sizes, surface areas, pore size diameters, and ion exchange capacities of synthetic polyvalent metal silicates and polyvalent metal carbonates can be made commercially.

Preferred examples of the anti-scalants of the present invention are listed in the following non-limiting list which is not intended to be an exhaustive list:

NATURAL POLYVALENT METAL SILICATES AND METAL CARBONATES
  POLYVALENT METAL SILICATES
    sodium montmorillonite (bentonite)
    magnesium aluminum silicate
      smectite clay
      colloidal attapulgite clay
    talc (hydrous magnesium silicate)
    hydrated magnesium aluminum silicate (e.g., smectite clay)
    calcium bentonite
    saponite (magnesium bentonite)
    sepiolite
  POLYVALENT METAL CARBONATES
    calcium carbonate
      ground calcium carbonate
    magnesium carbonate
    ferrous carbonate
    manganese carbonate
    dolomite SYNTHETIC POLYVALENT METAL SILICATES AND METAL CARBONATES
  POLYVALENT METAL SILICATES
    sodium aluminosilicate
      hydrated Na-A type zeolite
      mordenite zeolite
      synthetic amorphous precipitated silicate
    magnesium aluminum silicate
    synthetic hectorite (synthetic magnesium silicate)
    amorphous magnesium silicate
  POLYVALENT METAL CARBONATES
    calcium carbonate
      precipitated calcium carbonate
    magnesium carbonate
    zinc carbonate
    ferrous carbonate
    manganese carbonate In selecting other anti-scalants which may be useful in the present invention, compounds with an aluminosilicate backbone tend to function as anti-scalants.

Further, the selection of other anti-scalants may be based upon how the anti-scalants of the present invention are hypothesized to function. While not wishing to be bound by theory, the present invention may involve one or more of the following mechanisms, depending upon the type of anti-scalant.

For some anti-scalants, the mechanism of the present invention may involve ion exchange similar to the ion exchange involved in water softening. For instance, sodium ions could be exchanged for calcium ions, so as to reduce the concentration of calcium ions in the aqueous system to reduce precipitation of calcium compounds. It is believed that reducing the calcium concentration also slows the growth rate of calcium based crystals, such that the crystals which are formed tend to be smaller and more uniform. Smaller crystals are more stable in the aqueous phase and are less likely to precipitate on the equipment.

According to another hypothesized mechanism, the anti-scalant of the present invention may function as a nucleation initiator/promoter. Thus, the anti-scalant of the present invention may function as a seed. For instance, the scaling compound may precipitate on the anti-scalant instead of precipitating on the equipment. The nucleation initiator/promoter may be inorganic. Although other compounds may function as nucleation initiator/promoters, it is particularly believed that ground calcium carbonate functions as a nucleation promoter/initiator.

According to still another hypothesized mechanism, the anti-scalant of the present invention may function through surface adsorption. Although surface adsorption may be involved in the ion exchange and nucleation mechanisms described above, surface adsorption may be an independent mechanism. For instance, in surface adsorption it is not necessary for a separate solid phase to be formed on the surface of the anti-scalant.

In view of the above, it is hypothesized that the anti-scalant of the present invention may function as at least one of an ion exchanger, a nucleation promoter/initiator, and a surface adsorber, depending upon the anti-scalant.

The above listed anti-scalants may also be used in combination with each other. It was surprisingly found that some combinations of the above-listed anti-scalants resulted in synergism. In particular, combinations of sodium montmorillonite with either ground calcium carbonate or magnesium aluminum silicate yield unexpected results.

Regarding the combination of calcium carbonate and sodium montmorillonite, the weight ratio of calcium carbonate to sodium montmorillonite is preferably about 0.1:1 to 20:1, more preferably about 0.5:1 to 7:1, and most preferably about 1:1 to 4:1. Thus, the amount of calcium carbonate in the combination of calcium carbonate and sodium montmorillonite, with respect to a total amount of anti-scalant, is preferably about 10 wt % to 95 wt %, more preferably about 30 wt % to 90 wt %, and most preferably about 50 wt % to 80 wt %. Accordingly, the amount of sodium montmorillonite in the combination of calcium carbonate and sodium montmorillonite, with respect to a total amount of anti-scalant, is preferably about 5 wt % to 90 wt %, more preferably about 10 wt % to 70 wt %, and most preferably about 20 wt % to 50 wt %.

Concerning the combination of magnesium aluminum silicate and sodium montmorillonite, the weight ratio of magnesium aluminum silicate to sodium montmorillonite is preferably about 0.1:1 to 20:1, more preferably about 0.5:1 to 7:1, and most preferably about 1:1 to 4:1. Thus, the amount of magnesium aluminum silicate in the combination of magnesium aluminum silicate and sodium montmorillonite, with respect to a total amount of anti-scalant, is preferably about 10 wt % to 95 wt %, more preferably about 30 wt % to 90 wt %, and most preferably about 50 wt % to 80 wt %. Accordingly, the amount of sodium montmorillonite in the combination of magnesium aluminum silicate and sodium montmorillonite, with respect to a total amount of anti-scalant, is preferably about 5 wt % to 90 wt %, more preferably about 10 wt % to 70 wt %, and most preferably about 20 wt % to 50 wt %.

The particle size of the anti-scalant is preferably small. More specifically, depending upon the anti-scalant, the mean particle size of the anti-scalant is preferably less than about 100 microns, more preferably less than about 10 microns, most preferably less than about 3 microns, with ranges of preferably about 0.01 to 10 microns, more preferably about 0.1 to 5 microns, and most preferably about 0.1 to 3 microns. When calcium carbonate is formed in situ, as described below, the particle size is preferably about 0.01 to 10 microns, more preferably about 0.01 to 5 microns. Further, for alkaline earth metal carbonates, including ground calcium carbonate, the mean particle size is preferably less than about 2 microns, more preferably less than about 1 micron, and most preferably less than about 0.5 micron, with a range of about 0.1 to 2 microns. In this application, particle size is measured by dynamic light scattering at 25° C. in aqueous solution.

One reason that the particle size of the anti-scalant should be small is to increase the specific surface area. Depending upon the anti-scalant, the specific surface area of the anti-scalant is preferably about 10 to 1500 $m^2/g$, more preferably about 50 to 1000 $m^2/g$. For example, zeolites available from Zeolyst International, Delfziji, the Netherlands can be synthesized with a specific surface area in the range of about 400 to 950 $m^2/g$. In this application, surface area is measured by measuring a low temperature (77K) nitrogen isotherm, from which the surface area is calculated using BET equations.

In this regard, the particle size and surface area of the anti-scalants of the present invention may be adjusted by milling, grinding, or by adjusting temperature, pH, pressure, or other chemical/physical parameters of the environment in which it is made. With regard to calcium carbonate, depending on the milling process and dispersants added to the limestone starting material, different particle sizes and specific surface areas of ground calcium carbonate particles can be generated. Dispersants are used to control the viscosity, particle size, and stabilize the ground calcium carbonate slurry, which is typically about 75 wt % of solids. In this regard, dispersants stabilize particles from coming together so that particle size distribution is lowered. The following dispersants can be used but are not limited to: anionic polymers (e.g., polyacrylates, polysulfonates, polymaleates, lignosulfonates), nonionic polymers (e.g., polyvinyl alcohols, polyvinyl acetates, ethoxylate/propoxylate (EO/PO) block copolymers), cationic polymers (e.g., polyethylene imines, polyamines), anionic surfactants (e.g., dialkyl sulfosuccinates, alkyl phosphates, alkyl ether sulfates), cationic surfactants (e.g., fatty amine salts, alkyl quaternary amines), nonionic surfactants (e.g., sorbitan alkanoate, ethoxylated sorbitan alkanoate, alkyl phenol ethoxylate, fatty alcohol ethoxylate).

The scale inhibition effect of the anti-scalants of the present invention may also be enhanced by the presence of dispersants such as those noted above. Although the dispersants may be pre-mixed with the anti-scalant, such as during the milling process, the dispersant may also be added to the aqueous system separate from the anti-scalant of the present invention, either before or after the anti-scalant of the present invention. As an example, when calcium carbonate is formed in situ, as discussed in more detail below, it is preferred that a dispersant, such as those discussed above, e.g., polyacrylate, is also added. When a dispersant is used with the in situ formed calcium carbonate, a synergistic effect often results. For example, depending upon the pH, temperature, calcium concentration, and carbonate concentration, blends of precipitated calcium carbonate to dispersant at weight ratios of preferably about 50:1 to 1:1, more preferably about 20:1 to 1:1, and most preferably about 10:1 to 1:1, are often several times more effective than the individual components.

The scale inhibition effect of the anti-scalants of the present invention may also be enhanced by the presence of at least one protein. Although the protein may be pre-mixed with the anti-scalant, the protein may also be added to the aqueous system separate from the anti-scalant of the present invention, either before or after the anti-scalant of the present invention. Examples of proteins which may be used in combination with the present invention include soy protein such as "Soyprotein 3230" protein and "Soyprotein 4950" protein, both available from Central Soya, Fort Wayne, Ind. It has been found that "Soyprotein 4950 #1097-1" protein, which is "Soyprotein 4950" protein that has been treated with enzyme for 30 minutes, and which is available as available from Central Soya, Fort Wayne, Ind., may improve the scale inhibition effect of the anti-scalants of the present invention.

When a protein is used with the anti-scalant of the present invention, an unexpected and surprising synergistic effect may result. For example, blends of anti-scalant of the present invention and protein at weight ratios of anti-scalant to protein of preferably about 50:1 to 1:1, more preferably about 20:1 to 1:1, and most preferably about 10:1 to 1:1, are often several times more effective than the individual components. For instance, mixtures of ground calcium carbonate and either "Soyprotein 3230" protein or "Soyprotein 4950 #1097-1" protein are often several times more effective than the individual components.

Depending upon the type of anti-scalant, the ion exchange capacity of the anti-scalant may be an important variable.

For anti-scalants which may involve ion exchange for preventing scaling, such as zeolites, the ion exchange capacity is preferably at least about 0.1 meq/g, more preferably at least about 0.5 meq/g, and most preferably about 1.0 meq/g, with ranges typically of about 0.1 to 10 meq/g, more typically about 0.5 to 8.0 meq/g, and most typically about 1.0 to 8.0 meq/g. In contrast to some of the anti-scalants of the present invention, the ion exchange capacity of ground calcium carbonate is not important when the ground calcium carbonate is used to seed out calcium carbonate.

When calcium carbonate is used as the anti-scalant, it is preferred that ground calcium carbonate is used. Ground calcium carbonate can be produced by either dry or wet grinding of a feed rock in which the calcium carbonate species are usually divided into chalk, limestone, and marble. In the dry method, after screening to remove large particles, the feed rock may be dried such as in a rotary dryer and milled such as in a ball, roller, or hammer mill. The finest particles are typically air classified from the bulk material, with the coarse particles returned to the mill for further milling. This method is used for chalk fillers that are easily crumbled and typically produce coarse particles of 5 to 10 microns. Wet grinding, after crushing and ball milling, is more typical for the production of ground calcium carbonates from limestones and marbles. Flotation is used in this process to remove the contaminants, resulting in a high brightness of the finished product. Products having a median particle size less than 2 microns are usually wet ground in media or sand mills. Dispersants, such as those discussed above, are usually added during the grounding process to form a high solids slurry of the ground calcium carbonate. The level of impurities in the ground calcium carbonate is typically at least about 0.5 wt %, more typically at least about 0.8 wt %, and most typically at least about 1 wt %, with a range of typically about 1 to 2 wt %.

The inhibition of scaling by ground calcium carbonate relative to precipitated calcium carbonate was unexpected and surprising. While not wishing to be bound by theory, it is hypothesized that the non-porous structure of ground calcium carbonate is more effective than the porous structure of precipitated calcium carbonate. It is believed that the pores of the precipitated calcium carbonate slow the diffusion of aqueous calcium carbonate to the surface of the calcium carbonate, such that precipitation of aqueous calcium carbonate on precipitated calcium carbonate is slow relative to the ground calcium carbonate.

Many of the above-described anti-scalants are commercially available. Additionally, it is possible to form some of the above-described anti-scalants in situ. For example, calcium carbonate, magnesium carbonate, amorphous aluminum silicate, and ferric carbonate may be made in situ.

There are several ways to make calcium carbonate in situ which may function as an anti-scalant in accordance with the present invention. For example, one can purge $CO_2$ into an aqueous solution which contains calcium ions, e.g., cooking liquor or bleach plant filtrate. As another example, calcium ions, e.g., from calcium salt, can also be added to an aqueous solution containing carbonate ions, e.g., cooking liquor or bleach plant filtrate. In yet another example, calcium carbonate can be produced via the reaction of CaO with carbonate ions, e.g., calcium carbonate may be made by the causticizing reaction in the Kraft mill recovery system in which slaked lime (CaO) reacts with carbonate ions (via sodium carbonate) to form NaOH and calcium carbonate.

When the anti-scalant of the present invention is formed in situ, it was surprisingly found that some combinations of known anti-scalants with the in situ formed anti-scalants resulted in synergism. In particular, synergistic results occur when precipitated calcium carbonate, i.e., calcium carbonate that was formed in situ, is combined with known anti-scalants such as polyacrylic acid, polymaleic acid, copolymers of acrylic acid and 2-acrylamido-2-methylpropanesulfonic acid, and copolymers of acrylic acid and 2-hydroxy-3-allyloxypropanesulfonic acid, and phosphorous compounds such as nitrilotrimethylenephosphonic acid, hydroxy-ethylidenephosphonic acid, phosphonobutanetricarboxylic acid, and sodium hexametaphosphate. To avoid degrading the effectiveness of the anti-scalant of the present invention, the pH of the known anti-scalant is preferably above about 8, more preferably above about 9, and most preferably above about 10, prior to adding the anti-scalant of the present invention. In this regard, polyvalent metal carbonates, such as calcium carbonate, typically start to dissolve at pH less than 7, and polyvalent metal silicates become ineffective at low pH due to protonation of hydrogen ions. To maximize effectiveness, the weight ratio of precipitated calcium carbonate to conventional anti-scalant is preferably about 10:1 to 100:1, more preferably about 4:1 to 8:1, most preferably about 6:1.

The amount of anti-scalant added to the aqueous system depends upon such variables as the temperature, the pH, and the presence of other compounds. Regarding temperature, higher temperatures usually require higher amounts of anti-scalant. The effect of changes in pH on the amount of anti-scalant required depends upon the type of anti-scalant. Similarly, the effect of the presence of other compounds on the amount of anti-scalant depends on the other compound. For instance, compounds containing magnesium and iron may act as poisons such that more anti-scalant would be necessary. In contrast, compounds such as lignin function as enhancers such that less anti-scalant is necessary.

In view of the above, the anti-scalant is added to the aqueous system at a concentration of preferably about 1 ppb to 10 ppm, more preferably about 1 ppb to 7 ppm, and most preferably about 1 ppb to 5 ppm, per ppm of water hardness. Thus, the anti-scalant is added to the system at a concentration of up to about 50 ppm, more preferably up to about 75 ppm, even more preferably up to about 95 ppm, even more preferably up to about 200 ppm, even more preferably up to about 500 ppm, and most preferably up to about 1000 ppm, with ranges of preferably about 1 to 1000 ppm, more preferably about 1 to 500 ppm, and most preferably about 1 to 200 ppm.

The aqueous system to which the anti-scalant is added may contain metal ions, such as ions of calcium, barium, magnesium, aluminum, strontium, iron, etc. and anions such as bicarbonate, carbonate, oxalate, sulfate, phosphate, silicate, fluoride, etc.

The scale which is intended to be prevented by the present invention may be formed by any combination of the above-noted ions. For example, the scale may involve a combination of calcium carbonate and calcium oxalate. The scale typically comprises at least about 90 wt % of inorganic material, more typically at least about 95 wt % of inorganic material, and most typically at least about 99 wt % of inorganic material.

In aqueous systems having calcium ions and carbonate ions to which the anti-scalant may be added, prior to the addition of the anti-scalant, the $[Ca^{+2}]$ is usually present at about 10 to 500 ppm, more usually about 20 to 300 ppm, and most usually about 50 to 200 ppm. Moreover, prior to addition of the anti-scalant, the $[CO_3^{-2}]$ in such systems is usually present at about 100 to 30,000 ppm, more usually about 500 to 25,000 ppm, and most usually about 1000 to 20,000 ppm.

In aqueous systems having calcium ions and oxalate ions to which the anti-scalant may be added, prior to the addition of the anti-scalant, the [$Ca^{+2}$] is usually present at about 5 to 600 ppm, more usually about 10 to 500 ppm, even more usually about 20 to 500 ppm, and most usually about 30 to 400 ppm. Moreover, prior to addition of the anti-scalant, the [oxalate] in such systems is usually present at about 0.1 to 10,000 ppm, more usually about 1 to 5000 ppm, and most usually about 5 to 1000 ppm.

The aqueous system may also include other additives and compounds. For instance, the polyvalent metal anti-scalants of the present invention may be used with other anti-scalants such as those discussed in the Background of the present application, such as phosphates, acrylates, phosphonates, epoxysuccinic anhydrides, sulfonates, and maleates. The amount of other anti-scalant to be combined with the anti-scalant of the present invention depends upon the system conditions as well as the types of anti-scalants. The weight ratio of other anti-scalant to the anti-scalant of the present invention is preferably from about 1:100 to 100:1, more preferably about 1:30 to 30:1, and most preferably about 1:10 to 10:1. Although the anti-scalants may be added separately to the aqueous system, with the anti-scalant of the present invention added before or after the other anti-scalant, it is preferred that the anti-scalants are pre-mixed prior to addition to the aqueous system. The procedures for using the anti-scalants together should preserve the physical/chemical properties of the blends when mixing, e.g., the pH of the other anti-scalant is preferably above about 8, more preferably above about 9, and most preferably above about 10, for the reasons discussed above.

Other examples of additives include surfactants (e.g., ethoxylate/propoxylate (EO/PO) block copolymers, alkyl phenol ethoxylates, dialkyl sulfosuccinates, alkyl phosphates, alkyl ether sulfates, ethoxylated sorbitan alkanoates, fatty amine salts, fatty alcohol ethoxylate, and silicon based surfactants), dispersants such as those discussed above, pulping aids (e.g., AQ (anthraquinone), polysulfide, and the surfactants mentioned above), bleaching agents (e.g., enzymes, hydrogen peroxide, chlorine dioxide, hypochlorite, oxygen, ozone, and chelating agents such as EDTA (ethylenediamine tetraacetic acid), as well as flocculation, coagulation, and clarification polymers in system purge programs, as discussed in more detail below, e.g., effluent treatments, recovery boilers, clarifiers, filters, flotation cells, cleaners, and screens.

The aqueous system to which the anti-scalant is added may be at an elevated temperature. For instance, the temperature of the system may typically be about 25° C. to 500° C, more typically about 70° C. to 500° C., even more typically about 80° C. to 200° C. When the anti-scalant is added to a digester, the temperature of the aqueous system is usually about 150° C. to 175° C. When the anti-scalant is added at a chip chute pump prior to the digester, the temperature of the aqueous system is usually about 80° C. to 110° C.

The anti-scalants of the present invention work under various pH conditions. In particular, the anti-scalants of the present invention preferably work at a pH from about 2 to 14, more preferably about 3 to 14, and most preferably about 4 to 14, such as 10 to 14. As noted above, changes in pH may cause scaling.

In this regard, the anti-scalants of the present invention work under acidic conditions against some forms of scale, such as oxalate scales. For oxalate scaling, the aqueous system to which the anti-scalant is added often has a pH less than about 7, such as about 2 to 7, even more usually about 3 to 7. For instance, the pH in a typical bleach plant stage is usually about 2 to 12, more usually about 2 to 7, and even more usually about 2.5 to 5.

For carbonate scaling, the aqueous system to which the anti-scalant is added often has a basic pH, more usually a pH of at least about 9, with ranges of usually about 5 to 14, more usually about 9 to 14, even more usually about 10 to 13. In this regard, bleaching sequences in paper production generally occur at high pH, such as typically about 9 to 14, more typically about 10 to 12.

The aqueous system to which the anti-scalant is added may be under oxidative conditions. The ability of the anti-scalants of the present invention to function under oxidative conditions is important because bleaching conditions are often oxidative. Furthermore, oxidative conditions often degrade known anti-scalants. The oxidative conditions may be a result of hydrogen peroxide or chlorine dioxide. The hydrogen peroxide may be present at a level of about 100 to 10,000 ppm, more typically about 200 to 2000 ppm, even more preferably about 240 to 750 ppm. The chlorine dioxide may be present at a level of about 200 to 10,000 ppm, more typically about 500 to 3000 ppm, even more typically about 600 to 1100 ppm.

The aqueous system to which the anti-scalant is added may be under atmospheric conditions or under pressure. For instance, the pressure is typically about 14 to 1500 psi, more typically about 80 to 1500 psi. When the aqueous system comprises a digester of a paper mill, the pressure at the digester is typically about 125 to 150 psi. When the aqueous system comprises a boiler, the pressure at the boiler is typically up to about 1500 psi.

When the anti-scalant is not formed in situ, to ensure that the anti-scalant is adequately dispersed in the aqueous system, the anti-scalant is preferably added in the form of a water-based slurry. Depending upon the anti-scalant, the water-based slurry may comprise less than about 5 wt % of anti-scalant, less than about 2 wt % of anti-scalant, at least about 40 wt % of anti-scalant, at least about 50 wt % of anti-scalant, at least about 60 wt % of anti-scalant, or at least about 75 wt % of anti-scalant. For example, for ground calcium carbonate, if the amount of calcium carbonate is less than about 75 wt %, it may precipitate out of the slurry. As another example, for bentonite, if the amount of bentonite is greater than about 5 wt %, it is difficult to pump.

Examples of the systems to which the anti-scalant may be added include industrial water systems preferably having water throughputs of at least about 10 gpm, more preferably at least about 20 gpm, and even more preferably at least about 1000 gpm. Examples of industrial water systems of the present invention include cooling towers, heat exchangers, evaporators, pulping digesters, pulp washers, and pulp bleaching equipment. The industrial water systems may be involved in mining (e.g., ore washing under alkaline conditions), textiles (e.g., cooling towers, heat exchangers, washing processes), automotive (e.g., cooling towers, heat exchangers), food processing (e.g., processing equipment, clarification, aeration, sterilization, and breweries), steel making (e.g., cooling towers, heat exchangers), water treatment (e.g., water purification), and petroleum (e.g., in the production and processing of crude oil-water mixtures).

In particular, scale deposition in a digester in kraft pulp manufacturing can be controlled in accordance with the present invention. It follows that the run length of the digester can be extended to achieve improvements in productivity, uniform quality of pulp, and a reduction in energy loss. Further, troubles arising from scale deposit are greatly diminished, which makes a valuable contribution to improvement of operating efficiency.

The addition point of the anti-scalant may be at or before where scale may be formed. For example, the anti-scalant may be added before a pulping digester or at the pulping digester. As another example, the anti-scalant may be added immediately before or in bleaching plant equipment. When the anti-scalant is added before the pulping digester, it is often added after or during mechanical treatment of the wood chips. For instance, the anti-scalant may be added after a chip bin, at a wood chip chute pump, at a cooking liquor heater pump, or at an in-line drainer. When the anti-scalant is added directly to the digester or other systems, the addition point may be targeted to where the anti-scaling is needed most. For instance, the anti-scalant may be added in the cooking zone of the digester.

The anti-scalants of the present invention perform better than known anti-scaling polymers under many conditions. In addition to adequate or improved performance, the raw material cost of the polyvalent metal silicates and polyvalent metal carbonates is significantly lower than that of the known anti-scalants. Therefore, an advantage of the present invention is cost-effectiveness.

Once the anti-scalant has been used, e.g., after the pulp leaves the digester or after the bleaching process is completed, it may be preferred that the anti-scalant be removed from the system, e.g., the cooking liquor or the bleaching liquid. The removal of the anti-scalant depends upon the system and may involve mechanical and/or chemical separation techniques.

The mechanical separation may be by devices such as clarifiers, flotation cells, settling tanks, filters (pre-coat and cloth covered), centrifuges, and osmosis devices.

The chemical separation may involve use of clarifying aids, which may involve combining or reacting organic or inorganic chemicals with solids to form large masses that tend to separate rapidly. High molecular weight organic water soluble polymers are widely used as coagulants. Coagulant polymers may be cationic (e.g., polydiallyldimethylammonium chloride (polyDADMAC), polyamines), anionic (e.g., polyacrylamides, polyamides, polyacrylic acids), and nonionic (e.g., polyethylene oxide, polyvinyl alcohol). The amount of coagulant polymer is preferably up to about 10 ppm, more usually up to about 5 ppm, and most usually up to about 0.5 ppm. The coagulant polymers may have a molecular weight greater than about $1 \times 10^6$, with a usual range of about $1 \times 10^6$ to $10 \times 10^6$. Inorganic compounds such as alum hydroxide and iron hydroxide can also be used as coagulants.

The present invention will be further illustrated by way of the following Examples. These examples are non-limiting and do not restrict the scope of the invention.

Unless stated otherwise, all percentages, parts, etc. presented in the examples are by weight.

EXAMPLES 1–39 AND COMPARATIVE EXAMPLES 1 AND 2

A bottle test was conducted to determine the effect of polyvalent metal silicates and polyvalent metal carbonates on calcium carbonate scale inhibition and to compare their performance to known scale inhibitors. As discussed in more detail below, the test conditions were 70° C., pH 12.4, and a one-hour incubation time with mild agitation.

An aqueous hardness solution of 2.205 wt % calcium chloride was prepared. An aqueous alkaline solution of 0.18 wt % sodium carbonate and 0.2125 wt % sodium hydroxide was prepared. Both solutions were simultaneously added to 100 ml glass bottles followed by anti-scalants, as listed in Table 1, in proportions to achieve 100 g of final solution having the compositions listed in Tables 2 and 3, below. The solution pH was adjusted to 12.4 by adding sodium hydroxide. As shown in Tables 2 and 3, the final solution involved either a "mild" scaling condition of 60 ppm $Ca^{+2}$ (150 ppm as $CaCO_3$) and 1000 ppm $CO_3^{-2}$, or a "harsh" scaling condition of 100 ppm $Ca^{+2}$ (250 ppm as $CaCO_3$) and 10,000 ppm $CO_3^{-2}$.

After being agitated for 1 hour at 70° C., the solution was removed from the test bottle and subjected to vacuum filtration using a #4 Whatman filter (pore size <20–25 μm). Concerning the pore size of the filter, for these Examples and Comparative Examples, it is approximated that $CaCO_3$ crystals having a particle size less than about 20–25 microns have less tendency to precipitate on a substrate, and that crystals having a particle size greater than about 20–25 microns would be more likely to precipitate on a substrate and, therefore, would likely precipitate as scale. For instance, the relationship between particle size, crystallization rate, and precipitation is discussed in column 3 of U.S. Pat. No. 3,518,204 to HANSEN et al., the disclosure of which is herein incorporated by reference in its entirety. The filtrate sample was added to 2 grams of 30 wt % hydrochloric acid to prevent further crystal formation/growth.

After removal of the test solution from the test bottle, an "adherent" sample was generated for each test bottle, which involved rinsing the glass bottle with 50 grams of 14 wt % nitric acid. The adherent sample indicates the amount of calcium carbonate that deposits onto the bottle surface during the test period.

All liquid samples were analyzed by Inductively Coupled Plasma (ICP) for calcium ion concentrations. ICP was conducted by using an "IRIS-AP Duo" inductively coupled plasma spectrometer available from Thermo Jarrell Ash Corporation, Franklin, Mass. The operating conditions of the "IRIS-AP Duo" inductively coupled plasma spectrometer were as follows. The exhaust was turned on and the pressure gauge indicated a pressure drop of 0.8 to 1.2 psi. The CID (charge injection device) temperature was below −70° C. and the FPA (Focal Plane Array) temperature was above 5° C. The purge time was set to 90 seconds. The ignition parameters were: RF (Radio Frequency) Power: 1150 watts, Auxiliary Flow: medium, Nebulizer Flow: 0.55 L/min, and Pump Rate 110 rpm. The purge gas valves for tank and main were set to 4 L/min and 6 L/min, respectively. The camera valve setting was 2 L/min. After the spectrometer was set as discussed above, the spectrometer was allowed to warm up for at least 15 minutes before running the auto-sampler.

As noted above, Table 1 lists the anti-scalants which were used in the Examples and Comparative Examples of the present application.

TABLE 1

| Anti-Scalant | Chemical Name | Trade Name | Mfg. | Physical/Chemical Properties |
|---|---|---|---|---|
| A | sodium aluminosilicate (hydrated Na-A type zeolite) | Valfor 100 | The PQ Corp., Valley Forge, PA | Silica-to-alumina molar ratio = 2:1<br>median particle size 3 to 6 μm<br>normal pore size diameter = 4.2 Angstroms |

TABLE 1-continued

| Anti-Scalant | Chemical Name | Trade Name | Mfg. | Physical/Chemical Properties |
|---|---|---|---|---|
| | | | | pH of 1 wt % dispersion = 10 to 11<br>ion exchange capacity = 5.6 Meq/g hydrated zeolite<br>calcium exchange capacity = 270–300 mg $CaCO_3$/g anhydrous zeolite<br>$Na_2O$ (17 wt %), $Al_2O_3$ (28 wt %), $SiO_2$ (33 wt %), $H_2O$ (22 wt %) |
| B | sodium aluminosilicate (mordenite type zeolite) | Valfor CBV 20A | The PQ Corp., Valley Forge, PA | $SiO_2/Al_2O_3$ mole ratio = 20<br>Surface Area = 500 $m^2$/g |
| C | magnesium aluminum silicate (colloidal attapulgite clay) | Min-U-Gel 400 | Floridin, Tallahassee, FL | median particle size 3.22 $\mu$m (range 3.02 to 3.47 $\mu$m)<br>pH = 9.7 sp. gr. = 2.4<br>$Al_2O_3$ (10.37 wt %), $SiO_2$ (58.66 wt %), MgO (8.59 wt %), $Fe_2O_3$ (3.56 wt %), CaO (2.59 wt %), $H_2O$ (11.4 wt %) |
| D | ground calcium carbonate | Hydrocarb 60 | OMYA, Inc., Proctor, VT | mean particle diameter = 1.9 $\mu$m<br>specific surface area = 6 $m^2$/g<br>pH slurry = 8.5 sp. gr. = 2.71 |
| E | ground calcium carbonate | Hydrocarb 65 | OMYA, Inc., Proctor, VT | mean particle diameter = 0.7 $\mu$m<br>specific surface area = 14 $m^2$/g<br>pH slurry = 8.5 sp. gr. 2.71 |
| F | ground calcium carbonate | Hydrocarb HG | OMYA, Inc., Proctor, VT | mean particle diameter = 0.3 $\mu$m<br>pH slurry = 8.5 sp. gr. = 2.71 |
| G | sodium montmorillonite (bentonite) | Bentolite HS | Southern Clay Products, Inc., Gonzales, TX | particle size range = 0.1 to 5 microns<br>pH = 10.3 moisture = 6 wt % |
| H | synthetic hectorite (synthetic magnesium silicate) | Laponite RD | Southern Clay Products, Inc., Gonzales, TX | surface area = 370 m2/g<br>pH of 2 wt % suspension = 9.8<br>$SiO_2$ (59.5 wt %), MgO (27.5 wt %), $Na_2O$ (2.8 wt %), $Li_2O$ (0.8 wt %), ignition loss (8.2 wt %) |
| I | talc (hydrous magnesium silicate) | Vantalc F2003 | R. T. Vanderbilt Co., Norwalk, CT | mean particle diameter = 2.8 $\mu$m<br>specific surface area = 10 $m^2$/g<br>pH slurry = 9.5 sp. gr. = 2.75<br>$SiO_2$ (59.5 wt %), MgO (30.4 wt %), $Al_2O_3$ (0.4 wt %), $Fe_2O_3$ (3.2 wt %), CaO (0.3 wt %), ignition loss (6.3 wt %) |
| J | magnesium aluminum silicate (smectite clay) | Veegum | R. T. Vanderbilt Co., Norwalk, CT | $SiO_2$ (63 wt %), MgO (10.5 wt %), $Al_2O_3$ (10.5 wt %), $Fe_2O_3$ (0.9 wt %), CaO (2.3 wt %), $Na_2O$ (2.4 wt %), $K_2O$ (1.3 wt %), ignition loss (7.5 wt %)<br>sp. gr. = 2.6 pH slurry = 9.5 |
| K | hydrated magnesium aluminum silicate (smectite clay) | Veegum HV | R. T. Vanderbilt Co., Norwalk, CT | $SiO_2$ (62 wt %), MgO (11.9 wt %), $Al_2O_3$ (10.7 wt %), $Fe_2O_3$ (0.7 wt %), CaO (2.4 wt %), $Na_2O$ (2.6 wt %), $K_2O$ (1.7 wt %), ignition loss (9 wt %) |
| L | sodium aluminosilicate (synthetic amorphous precipitated silicate) | Zeolex 23A | Kraft Chemical Co., Melrose Park, IL | avg. particle size = 6 $\mu$m<br>pH of 20 wt % dispersion = 10.2<br>surface area = 75 $m^2$/g |
| M | amorphous magnesium silicate | DAC III | Delta Chem., Inc., Searsport, ME | sp. gr. = 2.5 |
| N | a blend of magnesium bentonite and calcium bentonite | GEL | IMV Nevada, Armdosa Valley, NV | 97% minimum < 200 mesh<br>$SiO_2$ (47.2 wt %), $Al_2O_3$ (14.1 wt %), MgO (12.4 wt %), $Fe_2O_3$ (2 wt %), CaO (4.2 wt %) |
| O | sepiolite | Thermogel | IMV Nevada, Armdosa Valley, NV | finely-ground powder<br>$SiO_2$ (56 wt %), $Al_2O_3$ (4 wt %), MgO(20 wt %), $Fe_2O_3$ (1 wt %), CaO (0.5 wt %) |
| P | hydrated magnesium aluminum silicate | Veegum F | R. T. Vanderbilt Co., Norwalk, CT | 2 to 4 wt % cristobalite |
| Q | hydrated magnesium aluminum silicate | VanGel B | R. T. Vanderbilt Co., Norwalk, CT | 4 to 6 wt % cristobalite |
| R | sepiolite | Sepiogel F | IMV Nevada, Armdosa Valley, NV | 90% minimum < 325 mesh<br>moisture = 14 wt % |

TABLE 1-continued

| Anti-Scalant | Chemical Name | Trade Name | Mfg. | Physical/Chemical Properties |
|---|---|---|---|---|
| S | calcium bentonite | IGB | IMV Nevada, Armdosa Valley, NV | 98% minimum < 200 mesh moisture = 13 wt % $SiO_2$ (50.9 wt %), $Al_2O_3$ (20.8 wt %), $Fe_2O_3$ (1.5 wt %), MgO (2.4 wt %), CaO (4 wt %) |
| T | saponite (magnesium bentonite) | Imvite 1016 | IMV Nevada, Armdosa Valley, NV | finely-ground powder moisture = 10 wt % $SiO_2$ (44.6 wt %), $Al_2O_3$ (7.8 wt %), $Fe_2O_3$ (2.5 wt %), MgO (22.8 wt %), CaO (4.5 wt %) |
| U | magnesium aluminum silicate | Magnabrite T | American Colloid Co., Arlington Heights, IL | soft white flakes sp. gr.= 2.6 |
| V | precipitated calcium carbonate | Multifex MM Ultrafine Particle 5961 | Whittaker, Clark & Daniels, Inc., South Plainfield, NJ | particle size of 0.07 microns with untreated surface |
| W | reagent grade precipitated calcium carbonate | ACS reagent [471-34-1] | Sigma Chemical Corporation, St. Louis, MO | particle size > 2 microns chelometric standard |

The conditions and results of these tests are shown in Tables 2 and 3 below. For Table 2 the test conditions were at a temperature of 70° C., pH of 12.5, $[Ca^{+2}]$=60 ppm, and $[CO_3^{-2}]$=1000 ppm. In Table 2, "% inhibition" is a relative measure of how much scale formation is prevented, such that higher values reflect better prevention of scale formation. Percent inhibition is calculated as follows:

$$\% \text{ inhibition} = \frac{(\text{Ca conc. of treated sample}) - (\text{Ca conc. of untreated sample})}{(\text{Ca conc. total}) - (\text{Ca conc. of untreated sample})}$$

Taking into consideration that the Ca concentration (as $CaCO_3$) of the untreated sample is the Ca concentration (as $CaCO_3$) of Comparative Example 1 which is 5.9 ppm, and taking into consideration that the Ca concentration (as $CaCO_3$) total is 150 ppm, the percent inhibition for Example 1 is 11%=(21–5.9)/(150–5.9). Although higher % inhibitions are preferred, the % inhibition is preferably at least about 85%. Also, in Table 2, "% deposition" is the weight percent of Ca (as $CaCO_3$) which deposited on the surface.

TABLE 2

| | | | Soluble Calcium Conc. ($CaCO_3$ crystal size < 20 microns) | | Scale Deposition on Surface | |
|---|---|---|---|---|---|---|
| Example | Anti-scalant | Conc. (ppm) | Ca Conc. (as $CaCO_3$) (ppm) | % Inhibition | Ca Conc. (as $CaCO_3$) (ppm) | % deposition |
| Comp. 1 | None | — | 5.9 | — | 22 | 15% |
| 1 | A | 50 | 21 | 11% | 2.8 | 2% |
| 2 | A | 100 | 96 | 63% | 7.6 | 5% |
| 3 | B | 25 | 17 | 8% | 13 | 9% |
| 4 | B | 50 | 16 | 7% | 9 | 6% |
| 5 | B | 100 | 19 | 9% | 9.7 | 7% |
| 6 | C | 25 | 54 | 33% | 2.8 | 2% |
| 7 | C | 50 | 63 | 40% | 2.3 | 2% |
| 8 | C | 100 | 76 | 49% | 1.8 | 1% |
| 9 | G | 25 | 56 | 35% | 2.8 | 2% |
| 10 | G | 50 | 54 | 33% | 1.6 | 1% |
| 11 | G | 100 | 139 | 92% | 1.1 | 1% |
| 12 | H | 100 | 96 | 62% | 7 | 5% |
| 13 | I | 25 | 38 | 22% | 2.1 | 1% |
| 14 | I | 50 | 41 | 25% | 2.1 | 1% |
| 15 | I | 100 | 33 | 19% | 1.9 | 1% |
| 16 | L | 100 | 23 | 12% | 17 | 11% |
| 17 | M | 100 | 55 | 34% | 7.4 | 5% |
| 18 | N | 50 | 128 | 85% | 1.8 | 1% |
| 19 | N | 100 | 138 | 92% | 2.7 | 2% |
| 20 | O | 50 | 88 | 57% | 2.7 | 2% |
| 21 | O | 100 | 96 | 63% | 2.7 | 2% |
| 22 | P | 50 | 102 | 67% | 1.4 | 1% |
| 23 | P | 100 | 92 | 60% | 2.4 | 2% |
| 24 | Q | 50 | 73 | 47% | 2.5 | 2% |
| 25 | Q | 100 | 93 | 60% | 5.1 | 3% |
| 26 | R | 50 | 108 | 71% | 1.5 | 1% |

TABLE 2-continued

| Example | Anti-scalant | Conc. (ppm) | Soluble Calcium Conc. (CaCO$_3$ crystal size < 20 microns) | | Scale Deposition on Surface | |
|---|---|---|---|---|---|---|
| | | | Ca Conc. (as CaCO$_3$) (ppm) | % Inhibition | Ca Conc. (as CaCO$_3$) (ppm) | % deposition |
| 27 | R | 100 | 110 | 72% | 1.8 | 1% |
| 28 | S | 50 | 97 | 63% | 2.2 | 2% |
| 29 | S | 100 | 117 | 77% | 2.9 | 2% |
| 30 | T | 50 | 127 | 84% | 1.9 | 1% |
| 31 | T | 100 | 127 | 84% | 2.1 | 1% |
| 32 | U | 50 | 118 | 78% | 1.5 | 1% |
| 33 | U | 100 | 122 | 81% | 1.2 | 1% |

Table 2 shows that under the "mild" scaling condition (i.e., 60 ppm $Ca^{+2}$ and 1000 ppm $CO_3^{-2}$), all tested anti-scalants, except anti-scalants B and L, were effective at either inhibiting crystal formation or reducing scale deposition on surface. The percent scale deposition was significantly reduced when calcium carbonate was treated with these polyvalent metal silicates and polyvalent metal carbonates, especially anti-scalants C, G, I, and N–U.

In Table 3 below, the test conditions were at a temperature of 70° C., pH 12.5, $[Ca^{+2}]$=100 ppm, and $[CO_3^{-2}]$=10,000 ppm.

TABLE 3

| Example | Anti-scalant | Conc. (ppm) | Soluble Calcium Conc. (CaCO$_3$ crystal size < 20 microns) | | Scale Deposition on Surface | |
|---|---|---|---|---|---|---|
| | | | Ca Conc. (as CaCO$_3$) | % Inhibition | Ca Conc. (as CaCO$_3$) | % deposition |
| Comp. 2 | None | — | 15 | — | 27.0 | 11% |
| 34 | G | 50 | 54 | 17% | 4.5 | 2% |
| 35 | N | 50 | 161 | 62% | 3.7 | 2% |
| 36 | O | 50 | 87 | 31% | 4.5 | 2% |
| 37 | R | 50 | 95 | 34% | 4.2 | 2% |
| 38 | T | 50 | 181 | 71% | 3.1 | 1% |
| 39 | U | 50 | 154 | 59% | 2.9 | 1% |

Table 3 indicates that anti-scalants G, N, 0, R, T, and U were also effective at reducing scale formation and deposition under the "harsh" condition (i.e., 100 ppm $Ca^{+2}$ and 10,000 ppm $CO_3^{-2}$).

In looking at the data of Tables 2 and 3, it should be noted that polyvalent metal silicates and polyvalent metal carbonates, such as magnesium aluminum silicate, magnesium silicate, magnesium bentonite, calcium bentonite, and sepiolite, are not normally used as water softeners, due to the lack of ion-exchanging properties. However, these polyvalent metal silicates and polyvalent metal carbonates perform effectively for CaCO$_3$ scale control. Surprisingly, sodium aluminosilicates (e.g., anti-scalant B and L), which supposedly function as water softeners, do not perform as well in terms of inhibiting CaCO$_3$ crystal formation and reducing scale deposition.

EXAMPLES 40–43 AND COMPARATIVE EXAMPLES 3–7

A "Parr®" bomb test was conducted to compare the performance of sodium montmorillonite (bentonite), i.e., anti-scalant G, with a known anti-scaling polymer. The experiments were conducted at a temperature which simulates the temperature of kraft pulping processes.

The test conditions were 170° C., pH 12.4, 60 ppm $Ca^2$, 1000 ppm CO3–2, and a one-hour incubation time without agitation. The carbonate solution was preheated to 70° C. before mixing to obtain solutions having the concentrations listed in Tables 4 and 5, using the procedure described in Examples 1–39 and Comparative Examples 1 and 2.

After adding the solution to a Parr® bomb, Model 4751 available from Parr Instrument Company, Moline, Ill., having a capacity of 125 ml, the bombs were placed in an oven at 170° C. for one hour at a typical pressure of between 120 and 150 psi. After treatment, the bombs were removed from the oven and allowed to cool for one hour. The resulting fluids were removed from the bombs and subjected to a vacuum filtration as described in Examples 1–39 and Comparative Examples 1 and 2. After the fluid was removed from the bomb, an "adherent" sample was also generated from each Parry bomb by dissolving the deposited calcium carbonate on the substrate surface with 50 grams of 14 wt % nitric acid. All fluid samples were analyzed by Inductively Coupled Plasma (ICP) for calcium ion concentrations using the procedure described in Examples 1–39 and Comparative Examples 1 and 2.

In Table 4 below, the test conditions were at a temperature of 170° C., pH 12.5, $[Ca^{-2}]$=60 ppm, and $[CO_3^{-2}]$=1000 ppm. Comparative Examples 4 and 5 involve "DRAW-FAX342" copolymer of maleic acid and acrylic acid (2:1 molar ratio) having a molecular weight of about 2700, available from Draw Chemical Company.

TABLE 4

| Example | Anti-scalant | Conc. (ppm) | Soluble Calcium Conc. (crystal size < 20 microns) | | Scale Deposition on Surface | |
|---|---|---|---|---|---|---|
| | | | Ca Conc. (as CaCO$_3$) | % Inhibition | Ca Conc. (as CaCO$_3$) | % Deposition |
| Comp. 3 | None | — | 11 | — | 77 | 51% |
| 40 | G | 25 | 44 | 24% | 62 | 41% |
| 41 | G | 50 | 56 | 32% | 43 | 29% |
| 42 | G | 100 | 128 | 84% | 21 | 14% |
| Comp. 4 | DF342 | 20 | 34 | 16% | 58 | 39% |
| Comp. 5 | DF342 | 30 | 22 | 7% | 47 | 31% |

Table 4 shows that anti-scalant G, i.e., sodium montmorillonite, is more effective than the known polymer, i.e., "DRAWFAX342" copolymer of maleic acid and acrylic acid, with respect to the inhibition of crystal growth and reduction in scale deposition.

In Table 5 below, the test conditions were at a temperature of 170° C., pH 12.5, $[Ca^{+2}]$=100 ppm, and $[CO_3^{-2}]$=10,000 ppm.

TABLE 5

| Example | Anti-scalant | Conc. (ppm) | Soluble Calcium Conc. (crystal size < 20 microns) | | Scale Deposition on Surface | |
|---|---|---|---|---|---|---|
| | | | Ca Conc. (as $CaCO_3$) | % Inhibition | Ca Conc. (as $CaCO_3$) | % Deposition |
| Comp. 6 | None | — | 7.4 | — | 88 | 35% |
| 43 | G | 100 | 125 | 48% | 8 | 3% |
| Comp. 7 | DF342 | 100 | 106 | 41% | 98 | 39% |

Table 5 shows that anti-scalant G, i.e., sodium montmorillonite, performed even better when subjected to the "harsh" condition.

EXAMPLES 44–66 AND COMPARATIVE EXAMPLES 8–18

These Examples and Comparative Examples involve using a dynamic tube blocking test to study the effectiveness of various scale inhibitors. A basic solution containing carbonate and anti-scalant was mixed with a calcium solution in a capillary to test the effectiveness of the anti-scalants in preventing scaling as measured by pressure build-up in the capillary.

In view of the above, except for Examples 54 and 55 which involved 73.78 g/l $Na_2CO_3$, the basic solution included:

37.09 g/l $Na_2CO_3$;
6 g/l NaOH (50 wt %); and
anti-scalant in an amount to obtain the concentrations of Tables 6 and 7.

The basic solution was fed through a first capillary at a flow rate of 12.5 ml/min. The calcium solution involved 0.74 g/l $CaCl_2.2H_2O$ and was fed at a rate of 12.5 ml/min through a second capillary which joined the first capillary to form a 2 meter-long capillary tube (internal diameter 0.127 cm).

As a result, the basic solution and calcium solution were mixed to form a supersaturated solution. The composition of the supersaturated aqueous solution was as follows, except for Examples 54 and 55 which involved 20,000 ppm of carbonate:

| Calcium ions | 96 ppm |
| Carbonate ions | 10,054 ppm |
| NaOH | 0.15 wt % (pH = 12.5) |
| Temperature | 170° C. |

The supersaturated solution was pumped through the 2 meter-long capillary at a flow rate of 25 ml/min at a temperature of 170° C. and pressure of 55 psi.

Calcium carbonate crystals formed and precipitated as soon as the two solutions were mixed in the capillary tube. The degree of precipitation was dependent on the effectiveness and concentration of the scale inhibitor, and was indicated by the back pressure across the capillary, which was measured by a pressure transducer. A low differential pressure was indicative of an effective treatment. The test was run for 30 minutes or until an increase of 1 psi was obtained. The longer the time (i.e., induced time) elapsed to reach 1 psi, the more effective the chemical treatment.

As listed in Tables 6 and 7, a number of polyvalent metal silicates and polyvalent metal carbonates were tested using the dynamic tube blocking test and the results were compared to the performance of known anti-scalants, such as PESA (polyepoxysuccinic acid), AMP (amino tri-(methylene phosphonic acid)), PBTC (2-phosphonobutane-1,2,4-tricarboxylic acid), "DRAWFAX342" copolymer (described above), and "SB 37105" polyacrylic acid having a molecular weight of 3300, available from Performance Process Incorporated, Mundelein, Ill.

TABLE 6

| Example | Anti-scalant | Conc. (ppm) | $[CO_3^{-2}]$ | Induction Time to 1 psi (minutes) |
|---|---|---|---|---|
| Comp. 8 | None | — | 10,054 | 2 |
| Comp. 9 | PESA | 25 | 10,054 | 2 |
| Comp. 10 | PESA | 50 | 10,054 | 2 |
| Comp. 11 | DF342 | 50 | 10,054 | 11 |
| Comp. 12 | DF342 | 70 | 10,054 | 14 |
| Comp. 13 | DF342 | 150 | 10,054 | 20 |
| Comp. 14 | SB 37105 | 45 | 10,054 | 6 |
| Comp. 15 | SB 37105 | 150 | 10,054 | 26 |
| Comp. 16 | AMP | 60 | 10,054 | 24 |
| Comp. 17 | PBTC | 50 | 10,054 | 14 |
| 44 | E | 30 | 10,054 | 29 |
| 45 | F | 10 | 10,054 | 29 |
| 46 | F | 15 | 10,054 | >30 (0.7 psi @ 30 min) |
| 47 | F | 30 | 10,054 | 26 |
| 48 | G | 15 | 10,054 | 10 |
| 49 | G | 30 | 10,054 | 31 (0.9 psi @ 30 min) |
| 50 | G | 50 | 10,054 | >30 (0.8 psi @ 30 min) |
| 51 | G | 70 | 10,054 | >30 (0.3 psi @ 30 min) |
| 52 | G | 150 | 10,054 | >30 (0.3 psi @ 30 min) |
| 53 | K | 150 | 10,054 | 20 |
| 54 | K | 500 | 20,000 | 4 |
| 55 | G | 200 | 20,000 | >30 (0.5 psi @ 30 min) |

The results in Table 6 indicate that PESA and maleic acid copolymer were not effective at inhibiting crystal growth and reducing scale deposition on the tube surface, as reflected by the very short induction time (2–6 minutes) to reach a differential pressure of 1 psi. In comparison, the untreated calcium carbonate solution reached this differential approximately 2 minutes.

Table 6 also indicates that the performance of anti-scalants E, F, and G was superior to the known anti-scalants. For instance, the performance of anti-scalant G at 30 ppm was more efficient than that of AMP at 60 ppm. It was expected that sodium aluminosilicate zeolite (i.e., anti-scalant A) would not perform well under the conditions of 96 ppm calcium and 20,000 ppm carbonate concentration, while Example 55 shows that under these conditions anti-scalant G still effectively controlled $CaCO_3$ scale formation and deposition.

Table 7 involves scale inhibition of sodium montmorillonite blended with either another polyvalent metal silicate or a polyvalent metal carbonate.

TABLE 7

| Ex. | Anti-Scalant | Conc. (ppm) | Induction Time to 1 psi (minutes) |
|---|---|---|---|
| Comp. 18 | None | | 2 |
| 56 | G | 30 ppm | 31 (0.9 psi @ 30 min) |
| 57 | G | 50 ppm | >30 (0.8 psi @ 30 min) |
| 58 | G | 70 ppm | >30 (0.3 psi @ 30 min) |
| 59 | G/J(1:1) | 40 ppm | >30 (0.4 psi @ 30 min) |
| 60 | J | 70 ppm | 6 |
| 61 | J | 150 ppm | 20 |
| 62 | G/E(1:1) | 30 ppm | >30 (0.9 psi @ 30 min) |
| 63 | G/E(1:3) | 30 ppm | 26 (0.6 psi @ 30 min) |
| 64 | G/F(2:1) | 10 ppm | >30 (0.3 psi @ 30 min) |
| 65 | G/F(2:1) | 20 ppm | >30 (0.3 psi @ 30 min) |
| 66 | G/F(2:1) | 200 ppm | >30 (0.2 psi @ 30 min) |

Table 7 shows that a strong synergism was observed when anti-scalant F was blended with anti-scalant G at a weight ratio of 1:2 before addition to the aqueous system. For instance, at 30 minutes the blend still exhibited a very low differential pressure (0.3 psi), at a very low dosage of 10 ppm. In comparison, a differential pressure of 1 psi was reached for anti-scalant G (15 ppm) at 10 minutes and 29 minutes for anti-scalant F (10 ppm) at the same pressure. Table 7 also shows that a blend of anti-scalant J and anti-scalant G appeared to show a synergy.

EXAMPLES 67–71 AND COMPARATIVE EXAMPLES 19–26

A bottle test was conducted to compare the effect of calcium carbonate and known anti-scalants on calcium carbonate and calcium oxalate scale inhibition at different pH's. As discussed in more detail below, the test conditions were 70° C. and a one-hour incubation time with mild agitation.

Final solutions were generally prepared in accordance with the procedure of Examples 1–39 and Comparative Examples 1 and 2. In this regard, although the amount of solution used in each bottle test was 100 g, the amount of final solution prepared was sometimes greater than 100 g. In each case, however, the final solution had 60 ppm calcium, 500 ppm carbonate, and 100 ppm oxalate. The source for calcium and carbonate was the same as Examples 1–39 and Comparative Examples 1 and 2, and the source for oxalate was sodium oxalate. The solution pH was adjusted to the pH listed in Table 8, below, by adding sodium hydroxide.

After being agitated for 1 hour at 70° C., the solution was removed from the test bottle and subjected to vacuum filtration using a #114 Whatman filter (pore size 20 $\mu$m). As noted above, it is approximated that $CaCO_3$ and calcium oxalate crystals having a particle size less than about 20 microns have less tendency to precipitate on a substrate, and that crystals having a particle size greater than about 20 microns would be more likely to precipitate on a substrate and, therefore, would likely precipitate as scale. The filtrate sample was added to 2 grams of 30 wt % hydrochloric acid to prevent further crystal formation/growth.

After removal of the test solution from the test bottle, an "adherent" sample was generated from each test bottle in the same manner as Examples 1–39 and Comparative Examples 1 and 2. All liquid samples were analyzed by Inductively Coupled Plasma (ICP) for calcium ion concentrations in the same manner as Examples 1–39 and Comparative Examples 1 and 2.

The conditions and results of these tests are shown in Table 8 below. For Table 8 the test conditions were at a temperature of 70° C., [NaCl]=0.3 wt %, [$Ca^{+2}$]=100 ppm, [$CO_3^{-2}$]=500 ppm, and [oxalate]=100 ppm. In Table 8, SL 4560 and SL 4600 are "SL 4560" anti-scalant and "SL 4600" anti-scalant, respectively, both available from Hercules Incorporated, Wilmington, Del. "SL 4560" and "SL 4600" anti-scalants are proprietary blends of polycarboxylate and phosphate.

TABLE 8

| Example | Anti-scalant | Dosage, ppm as actives | pH | % Scale Inhibition |
|---|---|---|---|---|
| 67 | F | 0.5 | 9.4 | 84 |
| 68 | F | 0.5 | 10.0 | 90 |
| 69 | F | 0.5 | 10.5 | 83 |
| 70 | F | 0.5 | 11.0 | 80 |
| 71 | F | 0.5 | 11.5 | 95 |
| Comp. 19 | SL 4560 | 2.5 | 9.4 | 94 |
| Comp. 20 | SL 4560 | 2.5 | 10.0 | 91 |
| Comp. 21 | SL 4560 | 2.5 | 11.0 | 67 |
| Comp. 22 | SL 4560 | 2.5 | 11.0 | 39 |
| Comp. 23 | SL 4560 | 2.5 | 11.5 | 28 |
| Comp. 24 | SL 4600 | 5.0 | 9.4 | 87 |
| Comp. 25 | SL 4600 | 5.0 | 10.0 | 40 |
| Comp. 26 | SL 4600 | 5.0 | 10.5 | 41 |

Table 8 shows that anti-scalant F, i.e., calcium carbonate, which is in accordance with the present invention, performs well relative to known anti-scalants. In particular, lower dosages of the anti-scalant of the present invention generally performed at least as well as higher dosages of the known anti-scalants. Furthermore, lower dosages of the anti-scalant of the present invention out performed higher dosages of the known anti-scalants at higher pH.

EXAMPLES 72–74 AND COMPARATIVE EXAMPLES 27–35

A bottle test was conducted to compare the effect of calcium carbonate and known anti-scalants on calcium carbonate and calcium oxalate scale inhibition at higher concentrations of at least one of calcium, carbonate, and oxalate, relative to Examples 67–71 and Comparative Examples 19–26. The procedures were the same as in Examples 67–71 and Comparative Examples 19–26, except that the concentration of at least one of calcium, carbonate, and oxalate was increased as shown in Tables 9–11, below.

The conditions and results of a first set of tests are shown in Table 9 below. For Table 9 the test conditions were at a temperature of 70° C., 1 hour incubation time, pH =11.0, [NaCl]=0.3 wt %, [$Ca^{+2}$]=100 ppm, [$CO_3^{-2}$]=500 ppm, and [oxalate]=100 ppm. In Table 9, as well as in Tables 10 and 11, SL 4560 and SL 4600 refer to "SL 4560" anti-scalant and "SL 4600" anti-scalant, respectively, both available from Hercules Incorporated, Wilmington, Del., and AR970A refers to "AR970A" polyacrylate anti-scalant available from ALCO Chemical, Chattanooga, Tenn. For Table 9, the % inhibition is based on 20 ppm of calcium carbonate recovered in an untreated sample, and the dashes "-" indicate not tested.

TABLE 9

| | | % Inhibition, at indicated dosage of actives (ppm) | | | | | | |
|---|---|---|---|---|---|---|---|---|
| Example | Anti-scalant | 0.1 | 0.5 | 1.0 | 2.5 | 5.0 | 10.0 | 50.0 |
| Comp. 27 | SL 4560 | — | 3 | 8 | 29 | 32 | 92 | — |
| Comp. 28 | SL 4600 | — | 2 | 3 | 8 | 17 | 43 | — |

TABLE 9-continued

| Example | Anti-scalant | % Inhibition, at indicated dosage of actives (ppm) | | | | | | |
|---|---|---|---|---|---|---|---|---|
| | | 0.1 | 0.5 | 1.0 | 2.5 | 5.0 | 10.0 | 50.0 |
| 72 | F | 0 | 29 | 86 | — | 89 | — | 92 |
| Comp. 29 | AR 970A | — | — | — | — | 9 | 13 | — |

Table 9 shows that the calcium carbonate of the present invention inhibited scaling more effectively than the known anti-scalants under the conditions described.

The conditions and results of a second set of tests are shown in Table 10 below. For Table 10 the test conditions were at a temperature of 70° C., 1 hour incubation time, pH=11.0, [NaCl]=0.3 wt %, [$Ca^{+2}$]=100 ppm, [$CO_3^{-2}$]=1000 ppm, and [oxalate]=100 ppm. For Table 10, the % inhibition is based on 24 ppm of calcium carbonate recovered in an untreated sample.

TABLE 10

| Example | Anti-scalant | % Inhibition, at indicated dosage of actives (ppm) | | | | | | |
|---|---|---|---|---|---|---|---|---|
| | | 0.1 | 0.5 | 1.0 | 2.5 | 5.0 | 10.0 | 50.0 |
| Comp. 30 | SL 4560 | — | 0 | 1 | 11 | 17 | 18 | — |
| Comp. 31 | SL 4600 | — | 0 | 0 | 0 | 2 | 5 | — |
| 73 | F | 0 | 12 | 92 | — | 93 | — | 97 |
| Comp. 32 | AR 970A | — | — | — | — | 5 | 3 | — |

Table 10 shows that the calcium carbonate of the present invention inhibited scale more effectively than the known anti-scalants under the conditions described.

The conditions and results of a third set of tests are shown in Table 11 below. For Table 11 the test conditions were at a temperature of 70° C., 1 hour incubation time, pH =11.0, [NaCl]=0.3 wt %, [$Ca^{+2}$]=1000 ppm, [$CO_3^{-2}$]=1000 ppm, and [oxalate]=300 ppm. For Table 11, the % inhibition is based on 30 ppm of calcium carbonate recovered in an untreated sample.

TABLE 11

| Example | Anti-scalant | % Inhibition, at indicated dosage of actives (ppm) | | | | | | |
|---|---|---|---|---|---|---|---|---|
| | | 0.1 | 0.5 | 1.0 | 2.5 | 5.0 | 10.0 | 50.0 |
| Comp. 33 | SL 4560 | — | 0 | 1 | 8 | 10 | 22 | — |
| Comp. 34 | SL 4600 | — | 0 | 0 | 0 | 3 | 9 | — |
| 74 | F | 0 | 24 | 90 | — | 93 | — | 97 |
| Comp. 35 | AR 970A | — | — | — | — | 2 | 4 | — |

Table 11 shows that the calcium carbonate of the present invention inhibited scale more effectively than the known anti-scalants under the conditions described.

EXAMPLES 75–82 AND COMPARATIVE EXAMPLES 36–47

A bottle test was conducted to compare the effect of calcium carbonate and known anti-scalants on calcium carbonate scale inhibition under oxidative conditions and at higher concentrations of calcium, relative to Examples 1–39 and Comparative Examples 1 and 2. The procedures were the same as in Examples 1–39 and Comparative Examples 1 and 2, except as specified below, e.g., the concentration of calcium was higher, the pH was lower, and some of the examples were under oxidative conditions from hydrogen peroxide.

Final solutions were generally prepared in accordance with the procedure of Examples 1–39 and Comparative Examples 1 and 2. In this regard, although the amount of solution used in each bottle test was 100 g, the amount of final solution prepared was sometimes greater than 100 g. In each case, however, the final solution had 100 ppm calcium and 1000 ppm carbonate. The solution pH was adjusted to 11.0 by adding sodium hydroxide.

In those Examples involving hydrogen peroxide, the hydrogen peroxide was as follows: 1 g of 5000 ppm of hydrogen peroxide was added to 1 g of the anti-scalant and the solution was incubated for 10 minutes at 70° C. After the incubation, the hydrogen peroxide solution was added to 98 g of solution containing calcium carbonate or oxalate.

After being agitated for 1 hour at 70° C., the solution was removed from the test bottle and subjected to vacuum filtration using a #114 Whatman filter (pore size 20 μm). After removal of the test solution from the test bottle, an "adherent" sample was generated from each test bottle in the same manner as Examples 1–39 and Comparative Examples 1 and 2. All liquid samples were analyzed by Inductively Coupled Plasma (ICP) for calcium ion concentrations in the same manner as Examples 1–39 and Comparative Examples 1 and 2.

Conditions and results are shown in Table 12 below. For Table 12 the test conditions were at a temperature of 70° C., 1 hour incubation time, pH=11.0, [$Ca^{+2}$]=150 ppm, and [$CO_3^{-2}$]=1000 ppm.

TABLE 12

| Example | Anti-scalant | Dosage, ppm as actives | [$H_2O_2$] (ppm) | % Inhibition |
|---|---|---|---|---|
| 75 | F | 0.5 | 0 | 56 |
| 76 | F | 1 | 0 | 89 |
| 77 | F | 5 | 0 | 96 |
| 78 | F | 50 | 0 | 92 |
| Comp. 36 | SL 4560 | 5 | 0 | 8 |
| Comp. 37 | SL 4560 | 10 | 0 | 8 |
| Comp. 38 | SL 4560 | 25 | 0 | 98 |
| Comp. 39 | SL 4560 | 50 | 0 | 99 |
| Comp. 40 | SL 4600 | 5 | 0 | 0 |
| Comp. 41 | SL 4600 | 50 | 0 | 13 |
| 79 | F | 0.5 | 50 | 15 |
| 80 | F | 1 | 50 | 89 |
| 81 | F | 5 | 50 | 95 |
| 82 | F | 50 | 50 | 98 |
| Comp 42 | SL 4560 | 5 | 50 | 1 |
| Comp 43 | SL 4560 | 10 | 50 | 5 |
| Comp.44 | SL 4560 | 25 | 50 | 99 |
| Comp.45 | SL 4560 | 50 | 50 | 100 |
| Comp.46 | SL 4600 | 5 | 50 | 0 |
| Comp.47 | SL 4600 | 50 | 50 | 14 |

Table 12 shows that anti-scalant F of the present invention inhibits calcium carbonate scale more effectively than the known anti-scalants at lower dosages. Table 12 also shows that the anti-scalant of the present invention inhibits calcium carbonate scale more effectively than the known anti-scalants under oxidative conditions at lower dosages.

EXAMPLES 83–88 AND COMPARATIVE EXAMPLES 48–59

A bottle test was conducted to compare the effect of calcium carbonate and known anti-scalants on calcium carbonate and calcium oxalate scale inhibition under oxidative conditions and at higher concentrations of oxalate. The procedures were the same as in Examples 75–82 and Comparative Examples 36–47, except as specified below, e.g., the concentration of calcium was lower and oxalate was present.

Conditions and results are shown in Table 13 below. For Table 13 the test conditions were at a temperature of 70° C., 1 hour incubation time, pH=11.0, [NaCl]=0.3 wt %, [Ca$^{+2}$]=100 ppm, [CO$_3{}^{-2}$]=1000 ppm, and [oxalate]=300 ppm.

TABLE 13

| Example | Anti-scalant | Dosage, ppm as actives | [H$_2$O$_2$] (ppm) | % Inhibition |
|---|---|---|---|---|
| 83 | F | 0.5 | 0 | 24 |
| 84 | F | 1.0 | 0 | 90 |
| Comp. 48 | SL 4560 | 5 | 0 | 10 |
| Comp. 49 | SL 4560 | 10 | 0 | 25 |
| Comp. 50 | SL 4600 | 5 | 0 | 3 |
| Comp. 51 | SL 4600 | 10 | 0 | 9 |
| 85 | F | 0.5 | 50 | 53 |
| 86 | F | 1.0 | 50 | 89 |
| 87 | F | 25.0 | 50 | 100 |
| 88 | F | 50 | 50 | 97 |
| Comp. 52 | SL 4560 | 5 | 50 | 11 |
| Comp. 53 | SL 4560 | 10 | 50 | 13 |
| Comp. 54 | SL 4560 | 25 | 50 | 98 |
| Comp. 55 | SL 4560 | 50 | 50 | 98 |
| Comp. 56 | SL 4600 | 5 | 50 | 0 |
| Comp. 57 | SL 4600 | 10 | 50 | 7 |
| Comp. 58 | SL 4600 | 25 | 50 | 8 |
| Comp. 59 | SL 4600 | 50 | 50 | 30 |

Table 13 shows that the anti-scalant of the present invention inhibits calcium carbonate and calcium oxalate scale better than known anti-scalants at low concentrations under non-oxidizing conditions. Table 13 also shows that the anti-scalant of the present invention inhibits calcium carbonate and calcium oxalate scale better than known anti-scalants at low concentrations under oxidizing conditions, and the anti-scalant of the present invention inhibits the scale at least comparable to the known anti-scalants at higher concentrations under oxidizing conditions.

EXAMPLES 89–96 AND COMPARATIVE EXAMPLES 60–74

These Examples and Comparative Examples involve using a dynamic tube blocking test to study the effectiveness of various scale inhibitors against calcium carbonate scale. The procedures for these Examples and Comparative Examples were the same as in Examples 44–66 and Comparative Examples 8–18, except as noted below.

In each of these Examples and Comparative Examples, a basic solution included:

Na$_2$CO$_3$ and, optionally, sodium oxalate in an amount to obtain the concentrations of Table 14;

3 g/l NaOH; and anti-scalant in an amount to determine the threshold concentration.

The threshold concentration was the minimum concentration required to maintain the capillary pressure below 1 psi for 35 minutes run time.

The basic solution was fed through a first capillary at a flow rate of 12.5 ml/min. The calcium solution involved CaCl$_2$.2H$_2$O was fed at a rate of 12.5 ml/min through a second capillary which joined the first capillary to form a 2 meter-long capillary tube (internal diameter 0.127 cm). The CaCl$_2$.2H$_2$O of the calcium solution was at a concentration to obtain the concentrations of Table 14. Accordingly, the basic solution and calcium solution were mixed to form a supersaturated solution having the concentrations shown in Table 14.

In Table 14, SL 4324 refers to "SL 4324" polyacrylate anti-scalant available from Hercules Incorporated, Wilmington, Del. In Table 14, the test conditions were at 80° C. and a pH of 11.

TABLE 14

| Examples | Anti-Scalant | [Ca] (ppm) | [CO$_3{}^{-2}$] (ppm) | [oxalate] (ppm) | [H$_2$O$_2$] (ppm) | Threshold Concentration, ppm as actives |
|---|---|---|---|---|---|---|
| Comp. 60 | SL 4324 | 100 | 1000 | 0 | 0 | >32 |
| Comp. 61 | SL 4600 | 100 | 1000 | 0 | 0 | >15 |
| Comp. 62 | SL 4560 | 100 | 1000 | 0 | 0 | 11 |
| 89 | F | 100 | 1000 | 0 | 0 | 1.1 |
| Comp. 63 | SL 4324 | 200 | 1000 | 0 | 0 | >24 |
| Comp. 64 | SL 4600 | 200 | 1000 | 0 | 0 | >15 |
| Comp. 65 | SL 4560 | 200 | 1000 | 0 | 0 | 15.6 |
| 90 | F | 200 | 1000 | 0 | 0 | 1.1 |
| Comp. 66 | SL 4560 | 100 | 2500 | 0 | 0 | 11 |
| 91 | F | 100 | 2500 | 0 | 0 | 0.75 |
| Comp. 67 | SL 4560 | 100 | 5000 | 0 | 0 | >11 |
| 92 | F | 100 | 5000 | 0 | 0 | 0.75 |
| Comp. 68 | SL 4560 | 100 | 500 | 100 | 0 | 13.5 |
| 93 | F | 100 | 500 | 100 | 0 | 1.1 |
| Comp. 69 | SL 4600 | 100 | 500 | 100 | 0 | >13.5 |
| Comp. 70 | SL 4560 | 100 | 1000 | 100 | 0 | 8 |
| 94 | F | 100 | 1000 | 100 | 0 | 0.75 |
| Comp. 71 | SL 4600 | 100 | 1000 | 100 | 0 | >15 |
| Comp. 72 | SL 4560 | 100 | 1000 | 300 | 0 | 11 |
| 95 | F | 100 | 1000 | 300 | 0 | 0.9 |
| Comp. 73 | SL 4600 | 100 | 1000 | 300 | 0 | >15 |
| Comp. 74 | SL 4560 | 100 | 1000 | 300 | 25 | 11 |
| 96 | F | 100 | 1000 | 300 | 25 | 1.1 |

Table 14 shows that the minimum threshold concentration of the anti-scalant of the present invention is lower than the minimum threshold concentration of the known anti-scalants under all of the conditions tested.

EXAMPLES 97–116 AND COMPARATIVE EXAMPLES 75–78

A bottle test was conducted to compare the effect of calcium carbonate anti-scalant of the present invention and known anti-scalants on calcium oxalate scale inhibition under acidic conditions, with the exception of Example 116 which was under basic conditions. The procedures were the same as in Examples 1–39 and Comparative Examples 1 and 2, except as specified below.

Final solutions having the concentrations listed in Table 15 were generally prepared in accordance with the procedure of Examples 1–39 and Comparative Examples 1 and 2. In this regard, although the amount of solution used in each bottle test was 100 g, the amount of final solution prepared was sometimes greater than 100 g. The solution pH was adjusted to the pH listed in Table 15 by adding hydrochloric acid, or sodium hydroxide in the case of Example 116.

After being agitated for 1 hour at the temperature listed in Table 15, the solution was removed from the test bottle and subjected to vacuum filtration using a #114 Whatman filter (pore size 20 µm). After removal of the test solution from the test bottle, an "adherent" sample was generated from each test bottle in the same manner as Examples 1–39 and Comparative Examples 1 and 2. All liquid samples were analyzed by Inductively Coupled Plasma (ICP) for calcium ion concentrations in the same manner as Examples 1–39 and Comparative Examples 1 and 2.

Conditions and results are shown in Table 15 below.

EXAMPLES 117–130 AND COMPARATIVE EXAMPLES 79–82

These Examples and Comparative Examples involve using a dynamic tube blocking test to study the effectiveness of various scale inhibitors, including precipitated calcium carbonate to inhibit in situ formation of calcium carbonate and calcium oxalate scale. The procedures for these Examples and Comparative Examples were the same as in Examples 89–96 and Comparative Examples 60–74, except as noted below.

A basic solution included:

3.50 g/l $Na_2CO_3$;

0.3 g/l sodium oxalate;

3 g/l NaOH; and anti-scalant in an amount to obtain the concentrations of Table 16.

The basic solution was fed through a first capillary at a flow rate of 12.5 ml/min. The calcium solution involved 0.74 g/l $CaCl_2.2H_2O$ and was fed at a rate of 12.5 ml/min through a second capillary which joined the first capillary to form a 2 meter-long capillary tube (internal diameter 0.127 cm).

As a result, the basic solution and calcium solution were mixed to form a supersaturated solution. The composition

TABLE 15

| Examples | Anti-Scalant | Dosage ppm as actives | [Ca] (ppm) | [oxalate] (ppm) | pH | Temp. (° C.) | % Inhibition |
|---|---|---|---|---|---|---|---|
| 97 | F | 1 | 200 | 100 | 5 | 80 | 2.8 |
| 98 | F | 5 | 200 | 100 | 5 | 80 | 4.3 |
| 99 | F | 10 | 200 | 100 | 5 | 80 | 0 |
| 100 | F | 50 | 200 | 100 | 5 | 80 | 0 |
| 101 | F | 100 | 200 | 100 | 5 | 80 | 2.2 |
| 102 | F | 200 | 200 | 100 | 5 | 80 | 41.8 |
| 103 | V | 50 | 200 | 100 | 5 | 80 | 16.3 |
| 104 | V | 100 | 200 | 100 | 5 | 80 | 41.1 |
| 105 | V | 200 | 200 | 100 | 5 | 80 | 84.4 |
| 106 | G | 50 | 200 | 100 | 5 | 80 | 0 |
| 107 | G | 200 | 200 | 100 | 5 | 80 | 0 |
| Comp. 75 | SL 4600 | 1 | 200 | 100 | 5 | 80 | 31.9 |
| Comp. 76 | SL 4600 | 5 | 200 | 100 | 5 | 80 | 91.5 |
| Comp. 77 | SL 4600 | 10 | 200 | 100 | 5 | 80 | 91.5 |
| Comp. 78 | SL 4600 | 50 | 200 | 100 | 5 | 80 | 100 |
| 108 | F | 50 | 100 | 200 | 3.5 | 80 | 11.0 |
| 109 | F | 100 | 100 | 200 | 3.5 | 80 | 0 |
| 110 | F | 200 | 100 | 200 | 3.5 | 80 | 58.1 |
| 111 | F | 10 | 100 | 200 | 3.5 | 60 | 7.4 |
| 112 | F | 50 | 100 | 200 | 3.5 | 60 | 44.3 |
| 113 | F | 100 | 100 | 200 | 3.5 | 60 | 91.5 |
| 114 | F | 100 | 100 | 200 | 6.0 | 60 | 0 |
| 115 | F | 200 | 100 | 200 | 6.0 | 60 | 9.3 |
| 116 | F | 200 | 100 | 200 | 6.0 | 60 | 0 |

Table 15 shows that higher dosages of the anti-scalant of the present invention were required to inhibit scale as well as the known anti-scalant under acidic conditions.

Table 15 also shows that the anti-scalant of the present invention at the dosages listed in Table 15 did not effectively inhibit scale when the temperature was above 60° C. and the pH was 6 or higher. Thus, while not wishing to be bound by theory, it is believed that calcium oxalate scale forms more quickly at lower temperature and higher pH.

and conditions of the supersaturated aqueous solution were as follows:

| Calcium ions | 100 ppm |
|---|---|
| Carbonate ions | 1000 ppm |
| Oxalate ions | 100 ppm |
| NaOH | 0.15 wt % (pH = 11) |
| Temperature | 80° C. |

The supersaturated solution was pumped through the 2 meter-long capillary at a flow rate of 25 ml/min at a temperature of 80° C. and pressure of 55 psi.

In Table 16, AR 808 refers to "AR 808" polyacrylate available from ALCO Chemical, Chattanooga, Tenn. The pressure in the capillary was measured at different times as listed in Table 16.

TABLE 16

| Examples | Anti-Scalant | Concentration, as ppm actives | Weight Ratio of PCC to Polymer | Capillary Pressure Measurement Time (min) | P (psi) |
|---|---|---|---|---|---|
| Comp. 79 | None | | | 12 | 3 |
| Comp. 80 | AR 808 | 12 | | <10 | 2.5 |
| Comp. 81 | AR 808 | 24 | | 14 | 3.5 |
| Comp. 82 | AR 808 | 32 | | 23 | 3 |
| 117 | V | 5 | | <10 | 1.5 |
| 118 | V | 30 | | 18 | 1.5 |
| 119 | V | 50 | | 35 | 0.3 |
| 120 | V:AR 808 | 5 | 4:1 | 35 | 0.15 |
| 121 | V:AR 808 | 5 | 6:1 | 35 | 0.25 |
| 122 | V:AR 808 | 2.5 | 4:1 | 32 | 1.2 |
| 123 | V:AR 808 | 2.5 | 6:1 | 35 | 0.4 |
| 124 | V:AR 808 | 2.5 | 8:1 | 33 | 1.1 |
| 125 | V:AR 808 | 1.5 | 4:1 | 30 | 1.5 |
| 126 | V:AR 808 | 1.5 | 6:1 | 35 | 1.2 |
| 127 | V:AR 808 | 1.5 | 8:1 | 23 | 1.2 |
| 128 | F | 0.4 | | <10 | 1.5 |
| 129 | F | 0.6 | | 30 | 1.6 |
| 130 | F | 0.75 | | 35 | 0.7 |

Table 16 shows that precipitated calcium carbonate, which is similar to what would be formed in situ, inhibits scale more effectively than a known polymer in calcium carbonate and calcium oxalate forming systems. Table 16 also shows a synergistic effect when the precipitated calcium carbonate and the known polymer are pre-mixed before being added to the aqueous system.

EXAMPLES 131–141 AND COMPARATIVE EXAMPLES 83–85

A bottle test was conducted to compare the effect of calcium carbonate anti-scalant of the present invention and known anti-scalants on calcium oxalate scale inhibition. The procedures were the same as in Examples 97–116 and Comparative Examples 75–78, except as specified below.

The solution pH was adjusted to 11 by adding sodium hydroxide. In each case listed in Table 17, the concentration of calcium ions was 100 ppm, the concentration of oxalate ions was 200 ppm, and the temperature was 80° C.

TABLE 17

| Examples | Anti-Scalant | Concentration, as ppm actives | Weight Ratio of PCC to Polymer | % Inhibition |
|---|---|---|---|---|
| 131 | V | 20 | | 0 |
| 132 | V | 100 | | 0 |
| Comp. 83 | SL 4600 | 5 | | 96.4 |
| Comp. 84 | SL 4600 | 10 | | 96.8 |
| Comp. 85 | SL 4600 | 20 | | 97.8 |
| 133 | V:SL 4600 | 5 | 4:1 | 49.0 |
| 134 | V:SL 4600 | 10 | 4:1 | 69.8 |
| 135 | V:SL 4600 | 20 | 4:1 | 96.7 |
| 136 | V:SL 4600 | 5 | 1:4 | 93.3 |
| 137 | V:SL 4600 | 10 | 1:4 | 90.8 |
| 138 | V:SL 4600 | 20 | 1:4 | 99.8 |
| 139 | V:SL 4600 | 5 | 1:1 | 83.5 |
| 140 | V:SL 4600 | 10 | 1:1 | 94.2 |
| 141 | V:SL 4600 | 20 | 1:1 | 100.0 |

Table 17 shows that precipitated calcium carbonate does not inhibit calcium oxalate scale more effectively than a known polymer. Table 17 also shows that precipitated calcium carbonate and the known polymer can be pre-mixed before being added to the aqueous system to inhibit calcium oxalate scale.

EXAMPLES 142–143

These Examples and Comparative Examples involve using a dynamic tube blocking test to compare the effectiveness of ground calcium carbonate with reagent grade calcium carbonate. The procedures for these Examples and Comparative Examples were the same as in Examples 89–96 and Comparative Examples 60–74, except as noted below.

In Table 18, the test conditions were at 170° C., 2.6 wt % NaOH, 35 ppm calcium, and 6500 ppm carbonate. The threshold concentration was the minimum concentration required to maintain the capillary pressure below 1 psi for 35 minutes run time.

TABLE 18

| Example | Anti-Scalant | Threshold Concentration, ppm as actives |
|---|---|---|
| 142 | F | 9 |
| 143 | W | >200 |

Table 18 shows that ground calcium carbonate inhibits scaling better than reagent grade calcium carbonate.

EXAMPLES 144–149 AND COMPARATIVE EXAMPLES 86–88

These Examples and Comparative Examples involve using a dynamic tube blocking test to study the effectiveness of reagent grade precipitated calcium carbonate and ground calcium carbonate in inhibiting calcium carbonate scale. The procedures for these Examples and Comparative Examples were the same as in Examples 117–130 and Comparative Examples 79–82, except where noted below.

The pressure in the capillary was measured at different times as listed in Table 19. In Table 19, each Example and Comparative Example was conducted at a pH of about 13 with 2.6 wt % of NAOH being added, except for Comparative Example 88 and Examples 148 and 149 which were conducted at a pH of 11.

TABLE 19

| Examples | Anti-Scalant | Concentration, as ppm actives | [Ca] (ppm) | [CO$_3^{-2}$] (ppm) | Temp. (° C.) | Capillary Pressure Measurement Time (min) | Capillary Pressure Measurement P (psi) |
|---|---|---|---|---|---|---|---|
| Comp. 86 | None |  | 35 | 6500 | 170 | 5 | 3.8 |
| 144 | W | 200 | 35 | 6500 | 170 | 4 | 3.5 |
| 145 | F | 12 | 35 | 6500 | 170 | 35 | 0.7 |
| Comp. 87 | None |  | 90 | 10,000 | 170 | 3 | 3.3 |
| 146 | W | 50 | 90 | 10,000 | 170 | 17 | 2.7 |
| 147 | F | 15 | 90 | 10,000 | 170 | 35 | 0.25 |
| Comp. 88 | None |  | 100 | 1000 | 80 | 10 | 2.2 |
| 148 | W | 30 | 100 | 1000 | 80 | 18 | 1.5 |
| 149 | F | 0.75 | 100 | 1000 | 80 | 35 | 0.5 |

Table 19 shows that ground calcium carbonate inhibited calcium carbonate scale precipitated calcium carbonate.

EXAMPLES 150–170 AND COMPARATIVE EXAMPLES 89–102

These Examples and Comparative Examples involve using a dynamic tube blocking test to study the effectiveness of various scale inhibitors, including precipitated calcium carbonate to inhibit in situ formation of calcium carbonate scale. The procedures for these Examples and Comparative Examples were the same as in Examples 89–96 and Comparative Examples 60–74, except as noted below.

In Table 20, SP 3230 refers to "Soyprotein 3230" protein and SP 4950 refers to "Soyprotein 4950" protein, both available from Central Soya, Fort Wayne, Ind. The SP 4950-1 refers to "SP 4950 #1097-1" protein also available from Central Soya, which involves "Soyprotein 4950" protein which was treated with enzyme for 30 minutes prior to use. S12-29 refers to "S12-29" anionic protein and S12-21 refers to "S12–21" anionic protein, both available from Donlar Corporation, Bedford Park, Ill.

In Table 20, the conditions were 90 ppm of calcium, 10,000 ppm of carbonate, 2.6 wt % of NaOH, and a temperature of 170° C. The pressure in the capillary was measured at different times as listed in Table 20.

TABLE 20

| Examples | Anti-Scalant | Concentration, as ppm actives | Weight Ratio of GCC to Protein | Capillary Pressure Measurement Time (min) | Capillary Pressure Measurement P (psi) |
|---|---|---|---|---|---|
| Comp. 89 | None |  |  | 4 | 4.5 |
| 150 | F/SP 3230 | 1.5 | 4:1 | 5 | 1.5 |
| 151 | F/SP 3230 | 3 | 4:1 | 24 | 1.5 |
| 152 | F/SP 3230 | 4 | 4:1 | 31 | 1.5 |
| 153 | F/SP 3230 | 5 | 4:1 | 35 | 0.5 |
| 154 | F/SP 3230 | 5 | 2:1 | 35 | 0.5 |
| 155 | F/SP 3230 | 5 | 1:2 | 33 | 2 |
| 156 | F/S 12-29 | 5 | 1:1 | 14 | 1.8 |
| 157 | F/S 12-29 | 7 | 1:1 | 16 | 1.8 |
| 158 | F/S 12-21 | 5 | 1:1 | 13 | 1.8 |
| Comp. 90 | SP 4950 | 5 | 1:1 | 34 | 1.2 |
| 159 | F/SP 4950-1 | 5 | 1:1 | 35 | 1.4 |
| 160 | F/SP 4950-1 | 7 | 1:1 | 35 | 0.3 |
| Comp. 91 | SP 3230 | 20 |  | 4 | 3.5 |
| 161 | F | 11.25 |  | 35 | 0.4 |
| 162 | F | 7.5 |  | 30 | 2 |
| Comp. 92 | SP 4950 | 20 |  | 4 | 2 |
| Comp. 93 | SP 4950-1 | 20 |  | 4 | 3 |

Table 20 shows that ground calcium carbonate, i.e., anti-scalant F, inhibits scale when used in combination with proteins. For instance, ground calcium carbonate shows synergistic results when used in combination with SP 3230.

In Table 21, SP 4950-2 refers to "SP 4950 #1097-2" protein available from Central Soya, Fort Wayne, Ind., which involves "Soyprotein 4950" protein which was treated with enzyme for 2 hours prior to use. Calpro 75 refers to "Calpro 75" whey protein available from Calpro Ingredients, Corona, Calif. HC 200 refers to "Casein HC 200" casein protein available from National Casein Co., Chicago, Ill.

In Table 21, the conditions were 35 ppm of calcium, 6500 ppm of carbonate, 2.6 wt % of NaOH, and a temperature of 170° C. The pressure in the capillary was measured at different times as listed in Table 21.

TABLE 21

| Examples | Anti-Scalant | Concentration, as ppm actives | Weight Ratio of GCC to Protein | Capillary Pressure Measurement Time (min) | Capillary Pressure Measurement P (psi) |
|---|---|---|---|---|---|
| Comp. 94 | None |  |  | 4 | 4.5 |
| 163 | F/SP 4950-1 | 8 | 1:1 | 35 | 0.5 |
| 164 | F/SP 4950-1 | 5 | 1:1 | 24 | 1.9 |
| 165 | F/SP 4950-1 | 5 | 2:1 | 10 | 2 |
| 166 | F/SP 4950-1 | 5 | 1:2 | 14 | 1.8 |
| 167 | F/SP 4950-2 | 5 | 1:1 | 21 | 2 |
| Comp. 95 | F/HC 200 | 5 | 1:1 | 10 | 2.4 |
| Comp. 96 | F/Calpro 75 | 10 | 1:1 | 35 | 2 |
| Comp. 97 | F/Calpro 75 | 10 | 2:1 | 33 | 1.5 |
| Comp. 98 | F/Calpro 75 | 10 | 4:1 | 29 | 1.6 |
| Comp. 99 | F/Calpro 75 | 10 | 1:2 | 12 | 1.6 |
| Comp. 100 | SP 4950-1 | 10 |  | 8 | 1.7 |
| Comp. 101 | SP 4950-2 | 10 |  | 8 | 2 |
| 168 | F | 9 |  | 35 | 0.6 |

TABLE 21-continued

| Examples | Anti-Scalant | Concentration, as ppm actives | Weight Ratio of GCC to Protein | Capillary Pressure Measurement | |
|---|---|---|---|---|---|
| | | | | Time (min) | P (psi) |
| 169 | F | 7.5 | | 27 | 2.5 |
| 170 | V | 40 | | 17 | 1.5 |
| Comp. 102 | HC | 200 | 10 | 5 | 1.7 |

Table 21 also shows that ground calcium carbonate, i.e., anti-scalant F, inhibits scale when used in combination with proteins. For instance, ground calcium carbonate shows synergistic results when used in combination with SP 4950-1 when used at a weight ratio of 1:1.

While the invention has been described in connection with certain preferred embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. A method for inhibiting scale deposits in an aqueous system, comprising:
at least one of adding and forming anti-scalant in the aqueous system such that an amount of anti-scalant in the aqueous system is up to about 1000 ppm, wherein the anti-scalant comprises at least one of polyvalent metal silicate and polyvalent metal carbonate, wherein the aqueous system has a pH of at least about 9, and wherein a mean particle size of the anti-scalant is less than about 3 microns.

2. The method of claim 1, wherein the anti-scalant comprises polyvalent metal silicate and comprises at least one of sodium montmorillonite, magnesium aluminum silicate, talc, hydrated magnesium aluminum silicate, calcium bentonite, saponite, sepiolite, sodium aluminosilicate, hectorite, and amorphous magnesium silicate.

3. The method of claim 1, wherein the anti-scalant comprises polyvalent metal carbonate and comprises at least one of calcium carbonate, magnesium carbonate, ferrous carbonate, manganese carbonate, dolomite, and zinc carbonate.

4. The method of claim 1, wherein the anti-scalant comprises polyvalent metal carbonate, and wherein the polyvalent metal carbonate comprises ground calcium carbonate.

5. The method of claim 1, wherein the anti-scalant comprises ground calcium carbonate and sodium montmorillonite.

6. The method of claim 1, wherein the anti-scalant has a specific surface area of about 10 to 1000 $m^2/g$.

7. The method of claim 1, wherein the scale comprises alkaline earth metal scale.

8. The method of claim 1, wherein the scale comprises at least one of calcium carbonate and calcium oxalate.

9. The method of claim 1, wherein the aqueous system has a concentration of $Ca^{+2}$ of about 10 to 500 ppm and a concentration of $CO_3^{-2}$ of about 100 to 30,000 ppm prior to addition of the anti-scalant.

10. The method of claim 1, wherein the aqueous system has a concentration of $Ca^{+2}$ of about 10 to 500 ppm and a concentration of oxalate of about 0.1 to 10,000 ppm prior to addition of the anti-scalant.

11. The method of claim 1, wherein the aqueous system has a temperature of about 25° C. to 500° C.

12. The method of claim 1, wherein the aqueous system is at a pressure of about 80 to 1500 psi.

13. The method of claim 1, wherein the anti-scalant is at least one of added and formed one of before and in at least one of a cooling tower, heat exchanger, evaporator, pulping digester, pulp washer, and pulp bleaching equipment.

14. The method of claim 1, wherein the aqueous system involves one of papermaking, mining, textile making, auto making, food processing, steel making, water treatment, and petroleum processing.

15. The method of claim 1, further comprising adding at least one additional anti-scalant to the aqueous system.

16. The method of claim 1, further comprising adding at least one protein to the aqueous system.

17. The method of claim 1, wherein the scale comprises calcium carbonate, and wherein the anti-scalant has a specific surface area of about 10 to 1000 $m^2/g$, and wherein the aqueous system has a pH of about 9 to 14, and wherein the aqueous system has a concentration of $Ca^{+2}$ of about 10 to 500 ppm and a concentration of $CO_3^{-2}$ of about 100 to 30,000 ppm prior to addition of the anti-scalant, and wherein the aqueous system has a temperature of about 25° C. to 500° C.

18. A method for inhibiting scale deposits in an aqueous system, comprising:
at least one of adding and forming anti-scalant in the aqueous system such that an amount of anti-scalant in the aqueous system is up to about 1000 ppm, wherein the anti-scalant comprises at least one of polyvalent metal silicate and polyvalent metal carbonate, and wherein the aqueous system has a pH of at least about 9; and
adding dispersant to the aqueous system.

19. The method of claim 18, wherein the anti-scalant comprises polyvalent metal silicate and comprises at least one of sodium montmorillonite, magnesium aluminum silicate, talc, hydrated magnesium aluminum silicate, calcium bentonite, saponite, sepiolite, sodium aluminosilicate, hectorite, and amorphous magnesium silicate.

20. The method of claim 18, wherein the anti-scalant comprises polyvalent metal carbonate and comprises at least one of calcium carbonate, magnesium carbonate, ferrous carbonate, manganese carbonate, dolomite, and zinc carbonate.

21. The method of claim 18, wherein the anti-scalant comprises polyvalent metal carbonate, and wherein the polyvalent metal carbonate comprises ground calcium carbonate.

22. The method of claim 18, wherein the anti-scalant comprises ground calcium carbonate and sodium montmorillonite.

23. The method of claim 18, wherein the anti-scalant has a specific surface area of about 10 to 1000 $m^2/g$.

24. The method of claim 18, wherein the scale comprises alkaline earth metal scale.

25. The method of claim 18, wherein the scale comprises at least one of calcium carbonate and calcium oxalate.

26. The method of claim 18, wherein the aqueous system has a concentration of $Ca^{+2}$ of about 10 to 500 ppm and a concentration of $CO_3^{-2}$ of about 100 to 30,000 ppm prior to addition of the anti-scalant.

27. The method of claim 18, wherein the aqueous system has a concentration of $Ca^{+2}$ of about 10 to 500 ppm and a concentration of oxalate of about 0.1 to 10,000 ppm prior to addition of the anti-scalant.

28. The method of claim 18, wherein the aqueous system has a temperature of about 25° C. to 500° C.

29. The method of claim 18, wherein the aqueous system is at a pressure of about 80 to 1500 psi.

30. The method of claim 18, wherein the anti-scalant is at least one of added and formed one of before and in at least one of a cooling tower, heat exchanger, evaporator, pulping digester, pulp washer, and pulp bleaching equipment.

31. The method of claim 18, wherein the aqueous system involves one of papermaking, mining, textile making, auto making, food processing, steel making, water treatment, and petroleum processing.

32. The method of claim 18, further comprising adding at least one additional anti-scalant to the aqueous system.

33. The method of claim 18, further comprising adding at least one protein to the aqueous system.

34. The method of claim 18, wherein the scale comprises calcium carbonate, and wherein the anti-scalant has a specific surface area of about 10 to 1000 m$^2$/g, and wherein the aqueous system has a pH of about 9 to 14, and wherein the aqueous system has a concentration of Ca$^{+2}$ of about 10 to 500 ppm and a concentration of CO$_3^{-2}$ of about 100 to 30,000 ppm prior to addition of the anti-scalant, and wherein the aqueous system has a temperature of about 25° C. to 500° C.

35. A method for inhibiting scale deposits in an aqueous system, comprising:
forming anti-scalant in the aqueous system such that an amount of anti-scalant in the aqueous system is up to about 1000 ppm, wherein the anti-scalant comprises at least one of polyvalent metal silicate and polyvalent metal carbonate, wherein a mean particle size of the anti-scalant is less than about 3 microns.

36. A method for inhibiting scale deposits in an aqueous system, comprising:
forming anti-scalant in the aqueous system such that an amount of anti-scalant in the aqueous system is up to about 1000 ppm, wherein the anti-scalant comprises at least one of polyvalent metal silicate and polyvalent metal carbonate; and
adding dispersant to the aqueous system.

37. A method for inhibiting scale deposits in an aqueous system of a pulping mill, comprising:
at least one of adding and forming anti-scalant in the aqueous system at at least one of before a pulping digester and at a pulping digester, wherein the anti-scalant comprises at least one of polyvalent metal silicate and polyvalent metal carbonate.

38. The method of claim 37, wherein the anti-scalant comprises polyvalent metal silicate and comprises at least one of sodium montmorillonite, magnesium aluminum silicate, talc, hydrated magnesium aluminum silicate, calcium bentonite, saponite, sepiolite, sodium aluminosilicate, hectorite, and amorphous magnesium silicate.

39. The method of claim 37, wherein the anti-scalant comprises polyvalent metal carbonate and comprises at least one of calcium carbonate, magnesium carbonate, ferrous carbonate, manganese carbonate, dolomite, and zinc carbonate.

40. The method of claim 37, wherein the anti-scalant comprises polyvalent metal carbonate, and wherein the polyvalent metal carbonate comprises ground calcium carbonate.

41. The method of claim 37, wherein the anti-scalant comprises ground calcium carbonate and sodium montmorillonite.

42. The method of claim 37, wherein the anti-scalant has a specific surface area of about 10 to 1000m$^2$/g.

43. The method of claim 37, wherein the scale comprises alkaline earth metal scale.

44. The method of claim 37, wherein the scale comprises at least one of calcium carbonate and calcium oxalate.

45. The method of claim 37, further comprising adding up to about 10 ppm of coagulant to the aqueous system.

46. The method of claim 37, wherein the aqueous system has a concentration of Ca$^{+2}$ of about 10 to 500 ppm and a concentration of CO$_3^{-2}$ of about 100 to 30,000 ppm prior to addition of the anti-scalant.

47. The method of claim 37, wherein the aqueous system has a pH of about 9 to 14.

48. The method of claim 37, wherein the aqueous system has a temperature of about 25° C. to 500° C.

49. The method of claim 37, wherein the aqueous system is at a pressure of about 80 to 1500 psi.

50. The method of claim 37, further comprising adding at least one additional anti-scalant to the aqueous system.

51. The method of claim 37, further comprising adding at least one protein to the aqueous system.

52. The method of claim 37, further comprising removing the anti-scalant from the aqueous system by using at least one of a clarifier, flotation cell, settling tank, filter, centrifuge, and osmosis device.

53. The method of claim 37, wherein the scale comprises calcium carbonate, and wherein the anti-scalant has a specific surface area of about 10 to 1000 m$^2$/g, and wherein the aqueous system has a pH of about 9 to 14, and wherein the aqueous system has a concentration of Ca$^{+2}$ of about 10 to 500 ppm and a concentration of CO$_3^{-2}$ of about 100 to 30,000 ppm prior to addition of the anti-scalant, and wherein the aqueous system has a temperature of about 25° C. to 500° C.

54. A method for inhibiting scale deposits in an aqueous system of a pulping mill, comprising:
at least one of adding and forming anti-scalant in the aqueous system at at least one of immediately before a bleach plant stage and at a bleach plant stage, wherein the anti-scalant comprises at least one of polyvalent metal silicate and polyvalent metal carbonate.

55. The method of claim 54, wherein the anti-scalant comprises polyvalent metal silicate and comprises at least one of sodium montmorillonite, magnesium aluminum silicate, talc, hydrated magnesium aluminum silicate, calcium bentonite, saponite, sepiolite, sodium aluminosilicate, hectorite, and amorphous magnesium silicate.

56. The method of claim 54, wherein the anti-scalant comprises polyvalent metal carbonate and comprises at least one of calcium carbonate, magnesium carbonate, ferrous carbonate, manganese carbonate, dolomite, and zinc carbonate.

57. The method of claim 54, wherein the anti-scalant comprises polyvalent metal carbonate, and wherein the polyvalent metal carbonate comprises ground calcium carbonate.

58. The method of claim 54, wherein the anti-scalant comprises ground calcium carbonate and sodium montmorillonite.

59. The method of claim 54, wherein the anti-scalant has a specific surface area of about 10 to 1000 m$^2$/g.

60. The method of claim 54, wherein the scale comprises alkaline earth metal scale.

61. The method of claim 54, wherein the scale comprises at least one of calcium oxalate and calcium carbonate.

62. The method of claim 54, further comprising adding up to about 10 ppm of coagulant.

63. The method of claim 54, wherein the aqueous system has a concentration of Ca$^{+2}$ of about 10 to 500 ppm and a concentration of oxalate of about 0.1 to 10,000 ppm prior to addition of the anti-scalant.

64. The method of claim 54, wherein the aqueous system has a concentration of $Ca^{+2}$ of about 10 to 500 ppm and a concentration of $CO_3^{-2}$ of about 100 to 30,000 ppm prior to addition of the anti-scalant.

65. The method of claim 54, wherein the aqueous system has a pH of about 2 to 12.

66. The method of claim 54, wherein the aqueous system is oxidative.

67. The method of claim 54, wherein the aqueous system has a temperature of about 25° C. to 500° C.

68. The method of claim 54, wherein the aqueous system is at a pressure of about 80 to 1500 psi.

69. The method of claim 54, further comprising adding at least one additional anti-scalant to the aqueous system.

70. The method of claim 54, further comprising adding at least one protein to the aqueous system.

71. The method of claim 54, further comprising removing the anti-scalant from the aqueous system by using at least one of a clarifier, flotation cell, settling tank, filter, centrifuge, and osmosis device.

72. The method of claim 54, wherein the scale comprises at least one of calcium oxalate and calcium carbonate, and wherein the anti-scalant has a specific surface area of about 10 to 1000 $m^2/g$, and wherein the aqueous system has a pH of about 2 to 12, and wherein the aqueous system has a concentration of $Ca^{+2}$ of about 10 to 500 ppm prior to addition of the anti-scalant, and wherein prior to addition of the anti-scalant the aqueous system has at least one of a concentration of oxalate of about 0.1 to 10,000 ppm and a concentration of $CO_3^{-2}$ of about 100 to 30,000 ppm, and wherein the aqueous system has a temperature of about 25° C. to 500° C.

73. A method for inhibiting scale deposits in an aqueous system, comprising:
at least one of adding and forming anti-scalant in the aqueous system such that an amount of anti-scalant in the aqueous system is up to about 1000 ppm, wherein the anti-scalant comprises at least one of magnesium aluminum silicate, hydrated magnesium aluminum silicate, calcium bentonite, saponite, sepiolite, magnesium carbonate, ferrous carbonate, manganese carbonate, dolomite, hectorite, amorphous magnesium silicate, and zinc carbonate.

74. The method of claim 73, wherein the anti-scalant has a mean particle size of less than about 100 microns.

75. The method of claim 73, wherein the anti-scalant has a specific surface area of about 10 to 1000 $m^2/g$.

76. The method of claim 73, wherein the scale comprises alkaline earth metal scale.

77. The method of claim 73, wherein the scale comprises at least one of calcium carbonate and calcium oxalate.

78. The method of claim 73, wherein the aqueous system has a concentration of $Ca^{+2}$ of about 10 to 500 ppm and a concentration of $CO_3^{-2}$ of about 100 to 30,000 ppm prior to addition of the anti-scalant.

79. The method of claim 73, wherein the aqueous system has a pH of about 2 to 14.

80. The method of claim 73, wherein the aqueous system is oxidative.

81. The method of claim 73, wherein the aqueous system has a temperature of about 25° C. to 500° C.

82. The method of claim 73, wherein the aqueous system is at a pressure of about 80 to 1500 psi.

83. The method of claim 73, further comprising adding at least one additional anti-scalant to the aqueous system.

84. The method of claim 73, further comprising adding at least one protein to the aqueous system.

85. A method for inhibiting scale deposits in an aqueous system, comprising:
at least one of adding and forming anti-scalant in the aqueous system such that an amount of anti-scalant in the aqueous system is up to about 1000 ppm, wherein the anti-scalant comprises polyvalent metal carbonate, wherein a mean particle size of the anti-scalant is less than about 3 microns.

86. The method of claim 85, wherein the polyvalent metal carbonate comprises ground calcium carbonate.

87. The method of claim 85, wherein the scale comprises alkaline earth metal scale.

88. The method of claim 85, wherein the scale comprises at least one of calcium carbonate and calcium oxalate.

89. The method of claim 85, wherein the aqueous system has a pH of about 2 to 14.

90. The method of claim 85, wherein the aqueous system is oxidative.

91. The method of claim 85, wherein the aqueous system has a temperature of about 25° C. to 500° C.

92. The method of claim 85, wherein the aqueous system is at a pressure of about 80 to 1500 psi.

93. The method of claim 85, further comprising adding at least one additional anti-scalant to the aqueous system.

94. The method of claim 85, further comprising adding at least one protein to the aqueous system.

95. A method for inhibiting scale deposits in an aqueous system, comprising:
at least one of adding and forming anti-scalant in the aqueous system such that an amount of anti-scalant in the aqueous system is up to about 1000 ppm, wherein the anti-sealant comprises polyvalent metal carbonate; and
adding dispersant to the aqueous system.

96. The method of claim 95, wherein the polyvalent metal carbonate comprises ground calcium carbonate.

97. The method of claim 95, wherein the scale comprises alkaline earth metal scale.

98. The method of claim 95, wherein the aqueous system has a pH of about 2 to 14.

99. The method of claim 95, wherein the aqueous system has a temperature of about 25° C. to 500° C.

100. The method of claim 95, wherein the aqueous system is at a pressure of about 80 to 1500 psi.

101. The method of claim 95, further comprising adding at least one additional anti-scalant to the aqueous system.

102. The method of claim 95, further comprising adding at least one protein to the aqueous system.

103. A method for inhibiting scale deposits in an aqueous system, comprising:
at least one of adding and forming anti-scalant in the aqueous system, wherein the anti-scalant comprises at least one of polyvalent metal silicate and polyvalent metal carbonate; and
adding at least one protein to the aqueous system.

104. The method of claim 103, wherein an amount of anti-scalant in the aqueous system is up to about 1000 ppm.

105. The method of claim 103, wherein the anti-scalant has a mean particle size less than about 100 microns.

106. The method of claim 103, wherein the aqueous system has a pH of at least about 9.

107. The method of claim 103, wherein the at least one protein comprises soy protein.

* * * * *

UNITED STATES PATENT AND TRADEMARK OFFICE
CERTIFICATE OF CORRECTION

PATENT NO. : 6,365,101 B1
DATED : April 2, 2002
INVENTOR(S) : D. Nguyen et al.

It is certified that error appears in the above-identified patent and that said Letters Patent is hereby corrected as shown below:

<u>Title page,</u>
Item [75], Inventors, the order of the inventors should be listed as follows:
-- Tien-Feng Ling
  Duy T. Nguyen
  Xiang H. Wang
  Mitzi K. Fader
  Fushan Zhang --

Signed and Sealed this

Nineteenth Day of November, 2002

*Attest:*

*Attesting Officer*

JAMES E. ROGAN
*Director of the United States Patent and Trademark Office*